United States Patent
Reznik et al.

(10) Patent No.: US 9,727,530 B2
(45) Date of Patent: Aug. 8, 2017

(54) TRANSFORM DESIGN WITH SCALED AND NON-SCALED INTERFACES

(71) Applicant: QUALCOMM Incorporated, San Diego, CA (US)

(72) Inventors: Yuriy Reznik, San Diego, CA (US); Albert Scott Ludwin, San Diego, CA (US); Hyukjune Chung, San Diego, CA (US); Harinath Garudadri, San Diego, CA (US); Naveen B. Srinivasamurthy, Bangalore (IN); Phoom Sagetong, Orange, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 14/170,198

(22) Filed: Jan. 31, 2014

(65) Prior Publication Data

US 2014/0149478 A1 May 29, 2014

Related U.S. Application Data

(63) Continuation of application No. 11/691,268, filed on Mar. 26, 2007, now Pat. No. 8,849,884.
(Continued)

(51) Int. Cl.
*G06F 17/14* (2006.01)
*H04N 19/61* (2014.01)
*H04N 19/42* (2014.01)

(52) U.S. Cl.
CPC ............ *G06F 17/14* (2013.01); *G06F 17/147* (2013.01); *H04N 19/42* (2014.11); *H04N 19/61* (2014.11)

(58) Field of Classification Search
CPC .................................................... G06F 17/147
See application file for complete search history.

(56) References Cited

U.S. PATENT DOCUMENTS

| | | | |
|---|---|---|---|
| 4,864,529 | A | 9/1989 | Shah et al. |
| 5,233,551 | A | 8/1993 | White |

(Continued)

FOREIGN PATENT DOCUMENTS

| | | | |
|---|---|---|---|
| CN | 1503572 A | 6/2004 | |
| CN | 1719435 A | 1/2006 | |

(Continued)

OTHER PUBLICATIONS

A. Karatsuba and Y. Ofman, "Multiplication of Multidigit Nos. on Automata", Soviet Phys. Doklady, vol. 7, No. 7, 595-596, Jan. 1963.
(Continued)

*Primary Examiner* — Chuong D Ngo
(74) *Attorney, Agent, or Firm* — Elaine H. Lo

(57) ABSTRACT

Techniques for efficiently performing full and scaled transforms on data received via full and scaled interfaces, respectively, are described and comprise (1) performing a first transform on a block of first input values to obtain a block of first output values by scaling the block to obtain scaled input values, performing a scaled one-dimensional (1D) transform on each row of the block, and performing a scaled 1D transform on each column of the block; and (2) performing a second transform on a block of second input values to obtain a block of second output values by performing a scaled 1D transform on each row of the block, performing a scaled 1D transform on each column of the block, and scaling the block.

30 Claims, 11 Drawing Sheets

Related U.S. Application Data

(60) Provisional application No. 60/787,562, filed on Mar. 29, 2006.

(56) References Cited

U.S. PATENT DOCUMENTS

| | | | |
|---|---|---|---|
| 5,285,402 A | 2/1994 | Keith | |
| 5,642,438 A | 6/1997 | Babkin | |
| 5,701,263 A * | 12/1997 | Pineda | G06F 17/147 708/402 |
| 5,930,160 A | 7/1999 | Mahant-Shetti | |
| 6,058,215 A * | 5/2000 | Schwartz | G06T 9/007 348/403.1 |
| 6,084,913 A | 7/2000 | Kajiki et al. | |
| 6,189,021 B1 | 2/2001 | Shyu | |
| 6,223,195 B1 | 4/2001 | Tonomura | |
| 6,308,193 B1 | 10/2001 | Jang et al. | |
| 6,473,534 B1 | 10/2002 | Merhav et al. | |
| 6,529,634 B1 | 3/2003 | Thyagarajan et al. | |
| 6,694,342 B1 * | 2/2004 | Mou | G06F 17/147 382/250 |
| 6,757,326 B1 | 6/2004 | Prieto et al. | |
| 6,766,341 B1 * | 7/2004 | Trelewicz | G06F 17/14 708/400 |
| 6,870,963 B2 | 3/2005 | Govindaswamy et al. | |
| 6,917,955 B1 | 7/2005 | Botchev | |
| 7,007,054 B1 * | 2/2006 | Brady | G06F 17/147 708/402 |
| 7,421,139 B2 | 9/2008 | Hinds et al. | |
| 8,595,281 B2 | 11/2013 | Reznik | |
| 2001/0031096 A1 | 10/2001 | Schwartz et al. | |
| 2002/0009235 A1 | 1/2002 | Schwartz et al. | |
| 2002/0038326 A1 | 3/2002 | Pelton et al. | |
| 2003/0020732 A1 | 1/2003 | Jasa et al. | |
| 2003/0074383 A1 | 4/2003 | Murphy | |
| 2004/0117418 A1 | 6/2004 | Vainsencher et al. | |
| 2004/0236808 A1 | 11/2004 | Chen et al. | |
| 2005/0256916 A1 | 11/2005 | Srinivasan et al. | |
| 2006/0008168 A1 | 1/2006 | Lee | |
| 2006/0080373 A1 | 4/2006 | Hinds et al. | |
| 2006/0089960 A1 | 4/2006 | Hinds et al. | |
| 2007/0196025 A1 * | 8/2007 | Tran | G06F 17/147 382/250 |
| 2007/0200738 A1 | 8/2007 | Reznik et al. | |
| 2007/0233764 A1 | 10/2007 | Reznik et al. | |
| 2007/0271321 A1 | 11/2007 | Reznik et al. | |

FOREIGN PATENT DOCUMENTS

| | | |
|---|---|---|
| EP | 1311975 A1 | 5/2003 |
| GB | 2304946 A | 3/1997 |
| JP | 04141158 | 5/1992 |
| JP | 05108820 | 4/1993 |
| JP | H09204417 A | 8/1997 |
| JP | 10322219 A | 12/1998 |
| JP | 1175186 | 3/1999 |
| JP | 2000099495 A | 4/2000 |
| JP | 2002197075 A | 7/2002 |
| JP | 2003528668 | 9/2003 |
| JP | 2005501462 T | 1/2005 |
| JP | 2005327298 A | 11/2005 |
| RU | 2189120 C2 | 9/2002 |
| RU | 2003114715 A | 11/2004 |
| WO | 9613780 | 9/1996 |
| WO | 02101650 A2 | 12/2002 |
| WO | 03019787 A2 | 3/2003 |
| WO | 2007047478 | 4/2007 |

OTHER PUBLICATIONS

Ahmed N., et al., "Discrete Cosine Transform", IEEE Transactions on Computers, vol. C-23, pp. 90-93, Jan. 1974.
Boullis N., et al., "Some optimizations of hardware multiplication by constant matrices," IEEE Transactions on Computers, 2005, 54 (10), 1271-1282.
Bracamonte J et al., "A multiplierless implementation scheme for the JPEG image coding algorithm," Proceedings of the 2000 IEEE Nordic Signal Processing Symposium, Jun. 13-15, 20000, Kolmarden, Sweden, pp. 1-4.
C. Loeffler, A. Ligtenberg, and G.S. Moschytz. "Algorithm-Architecture Mapping for Custom DSP Chips." Proc. Int. Symp. Circuits Syst. (Helsinki, Finland), Jun. 1988, pp. 1953-1956.
Co-pending U.S. Appl. No. 60/726,307, filed Oct. 12, 2005.
Co-pending U.S. Appl. No. 60/726,702, filed Oct. 13, 2005.
Dempster A. G., et al., "Use of minimum-adder multiplier blocks in FIR digital filters,," IEEE Transactions on Circuits and Systems II: Analog and Digital Signal Processing, 1995, 42 (9), 569-577.
Dempster, A.G. et al., "Constant integer multiplication using minimum adders," IEEE Proceedings—Circuits, Devices and Systems, vol. 141, No. 5, pp. 407-413, Oct. 1994.
E. Feig and S. Winograd, "Fast Algorithms for the Discrete Cosine Transform", IEEE Transactions on Signal Processing, vol. 40, pp. 2174-2193, Sep. 1992.
Ephraim Feig, "A fast scaled-DCT algorithm", SPIE vol. 1244, Image Processing Algorithms and Techniques (1990), pp. 2-13.
Feig E., et al., "On the Multiplicative Complexity of Discrete Cosine Transforms (Corresp.)" IEEE Transactions on Information Theory, vol. 38, No. 4, pp. 1387-1391, (Jul. 1992).
G. Plonka and M. Tasche, "Integer DCT-II by Lifting Steps", International Series of Numerical Mathematics (W. Haussmann, K. Jetter, M. Reimer, J. Stockler (eds.)), vol. 145, Birkhauser, Basel, 2003, pp. 1-18.
G. Plonka and M. Tasche, "Invertible Integer DCT Algorithms", Applied Computational Harmonic Analysis, No. 15 (2003), pp. 70-88.
Hartley R.I., "Subexpression sharing in filters using canonic signed digit multipliers," IEEE Transactions on Circuits and Systems II: Analog and Digital Signal Processing, 1996, 43 (10), 677-688.
Hinds A T et al: "A Fast and Accurate Inverse Discrete Cosine Transform" IEEE Workshop on Signal Processing Systems (SIPS" 05) (Nov. 2, 2005), pp. 87-92, XP010882547 ISBN:978-0-7803-9333-2.
Hung A C et al., "A Comparison of fast inverse discrete cosine transform algorithms" Multimedia Systems, vol. 2. No. 5, Dec. 1994 pp. 204-217.
IEEE Std. 1180-1990; "IEEE Standard Specifications for the Implementations of 8×8 Inverse Discrete Cosine Transform," IEEE CAS Standards Committee of the IEEE Circuits and Systems Society, pp. 1-13, Approved Dec. 6, 1990.
International Search Report and Written Opinion—PCT/US07/065548, International Search Authority—European Patent Office—Mar. 23, 2010.
ISO/IEC JTC1/SC29/WG11 N7335, "Call for Proposals on Fixed-Point 8×8 IDCT and DCT Standard," pp. 1-18, Poznan, Poland, Jul. 2005.
ISO/IEC JTC1/SC29/WG11N7292 [Study on FCD] Information Technology—Coding of Moving Pictures and Associated Audio for Digital Storage Media at up to About 1.5 Mbit/s—Part 6: Specification of Accuracy Requirements for Implemenation of Inverse Discrete Cosine Transform, pp. 1-8.
J. Ziv and A. Lempel, "Compression of Individual Sequences via Variable-rate Coding", IEEE Transactions on Information Theory, vol. IT-24, No. 5, pp. 530-536, Sep. 1978.
Kikkawa, Sho, "Prospects of the Theory of Time-Frequency Analysis [IV] : Wavelets and Their Classification", The Journal of the Institute of Electronics,Information and Communication Engineers, Japan, The Institute of Electronics, Information and Communication Engineers, Aug. 1996, vol. 79, p. 820-830.
Liang J., et al., "Fast Multiplierless Approximations of the DCT with the Lifting Scheme", IEEE Transactions on Signal Processing, vol. 49, No. 12, Dec. 2001, pp. 3032-3044.
Linzer, E., et al.,: "New scaled DCT algorithms for fused multiply/add architectures" Proceedings of the 1991 IEEE Intr. Conf. on Acqustics, Speech and Signal Processing (ICASSP91), May 14-17, 1991 vol. 3, May 1991 pp. 2201-2204.

(56) References Cited

OTHER PUBLICATIONS

M13001: Yuriy A. Reznik and Arianne T. Hinds, "Improved Proposal for MPEG Fixed-Point 8×8 IDCT Standard," ISO/IEC JTC1/SC29/WG11 MPEG2006/M13001, Jan. 2006, Bangkok, Thailand, pp. 1-22.
Mitchell J. L., et al., "Enhanced parallel processing in wide registers, Denver, Colorado," Proceedings of the 19th IEEE International Parallel and Distributed Processing Symposium, 2005, 1-10.
Pai, C.Y, et al., Low-power data-dependent 8×8 DCT/IDCT for video compression, 2003, IEEE proceedings online No. 20030564, pp. 245-255.
Puschel M. et al., "Custom-optimized multiplierless implementations of DSP algorithms," 2004 IEEE/ACM International Conference on Computer Aided Design, Nov. 7-11, 2004, San Jose, CA, Nov. 7, 2004, pp. 175-182.
Qi H., et al., "An example of fixed-point IDCT for CFP on fixed-point 8×8 IDCT and DCT standard, Poznan, Poland, XP030041008," ISO/IEC JTC1/SC29/WG11 M12324, 2005, 1-16.
Qi H., et al., "High accurate and multiplier less fixed-point DCT, Poznan, Poland, XP030041006," ISO/IEC JTC1/SC29/WG11 M12322, 2005, 1-17.
R. Bernstein, "Multiplication by Integer Constants", Software-Practice and Experience, vol. 16, No. 7, pp. 641-652, Jul. 1986.
Rao, et al.: "Discrete cosine transform: algorithms, advantages, applications," Academic Press Professional, Inc., San Diego, CA, pp. 490, ISBN: 0-12-580203-X, 1990, CH. 3-4.
Rao, et al., "Discrete cosine transform: algorithms, advantages, applications," Academic Press Professional, Inc., San Diego, CA, pp. 53-62, 71-82 and 106-114, ISBN: 0-12-580203-X, 1990.
Rao, K.R., et al., "Discrete Cosine Transform: Algorithms, Advantages, Applications," Academic Press, San Diego, 1990, pp. 88-106.
Reznik et al., "Efficient fixed-point approximations of the 8×8 Inverse Discrete Cosine Transform", Applications of Digital Image Processing XXX, Sep. 24, 2007, pp. 669617-1-669617-17, vol. 6696, Proceedings of SPIE, XP002489240, ISSN: 0277-786X, DOI: 10.1117/12.740228.
Reznik, Y A et al., "Response to CE on Convergence of scaled and non-scaled IDCT architectures" ISO/IEC JTC1/SC29/WG11 M13650, Jul. 2006 Klagenfurt, Austria.
Reznik Y A et al.: "Summary of responses on CE on convergence of IDCT architectures" ISO/IEC CTC1/SC29/WG11 M13467, Jul. 2006, Klagenfurt, Austria.
Reznik Y., et al., "Fixed point multiplication-free 8×8 DCT/IDCT approximation , Nice, France ISO/IEC JTC1/SC29/WG11 M12607," 2005, 1-37.
Reznik Y.A. et al., "Low Complexity fixed-point approximation of inverse discrete cosine transform," Proceedings of the 2007 IEEE International Conference on Acoustics, Speech, and Signal Processing, Apr. 15-20, 2007, Honolulu, Hawaii, vol. 1, pp. 1109-1112.
Rija V N., et al., "Multicriterial Optimization Approach to Eliminating Multiplications", IEEE International Workshop on Multimedia Signal Processing, 2006, 368-371,Victoria, BC, Canada, XP002489671 ISBN;0-7803-9751-7.
Sullivan G. L., "Standardization of IDCT approximation behavior for video compression: the history and the new MPEG-C parts 1 and 2 standards," Applications of Digital Image Processing, Proceedings of SPIE, 2007, 6696, 669611-1 to 669611-22.
Taiwan Search Report—TW096111041—TIPO—Jun. 6, 2011.
T.M. Cover and J.A. Thomas, "Elements of Information Theory", Wiley, New York, 1991, pp. 1-36.
Trelewicz J Q et al: "Efficient integer implementations for faster linear 1-43transforms" Conference Record of the 35th Asilomar Conference on Signals, Systems & Computers, Nov. 4-7, 2001, Pacific Grove, CA, USA, vol. 2, Nov. 4, 2001 (Nov. 4, 2001), pp. 1161-1165, XP010582223 ISBN: 978-0-7803-7147-7.
V. Lefevre, "Moyens Arithmetiques Pour un Calcul Fiable", PhD Thesis, Ecole Normale Superieure de Lyon, Lyon, France, Jan. 2000.
Voronenko Y. et al., "Multiplierless multiple constant multiplication," ACM Transactions on Algorithms, vol. 3, No. 2, May 2007, pp. 1-38.
W. Chen, C.H. Smith and S.C. Fralick, "A Fast Computational Algorithm for the Discrete Cosine Transform", IEEE Transactions on Communications, vol. com-25, No. 9, pp. 1004-1009, Sep. 1977.
"Working Draft 1.0 of ISO/IEC 23002-2 Information technology—MPEG videotechnologies—Part 2: Fixed-point 8×8 IDCT and DCT transforms", I SO/I ECJTC1/SC29/WG11 N7817, ISO IEC WD 23002-2, Feb. 17, 2006 pp. 1-21 . [XP030014309].
Y.Arai, T. Agui, and M. Nakajima, "A Fast DCT-SQ Scheme for Images", Transactions of the IEICE vol. E 71, No. 11 Nov. 1988, pp. 1095-1097.
Yuriy A, et al., "Proposed Core Experiment (on Exploration) on Convergence of Scaled and Non-Scaled IDCT Architectures", Apr. 1, 2006, Montreux, Switzerland.
Zelinski A. C., et al., "Automatic cost minimization for multiplierless implementations of discrete signal transforms, May 17-21, 2004, Montreal, Quebec, Canasa, [XP002489236]," Proceedings of the 2004 IEEE International Conference on Acoustics, Speech, and Signal Processing (ICASSP 2004), 2004, 17, 221-224.

\* cited by examiner

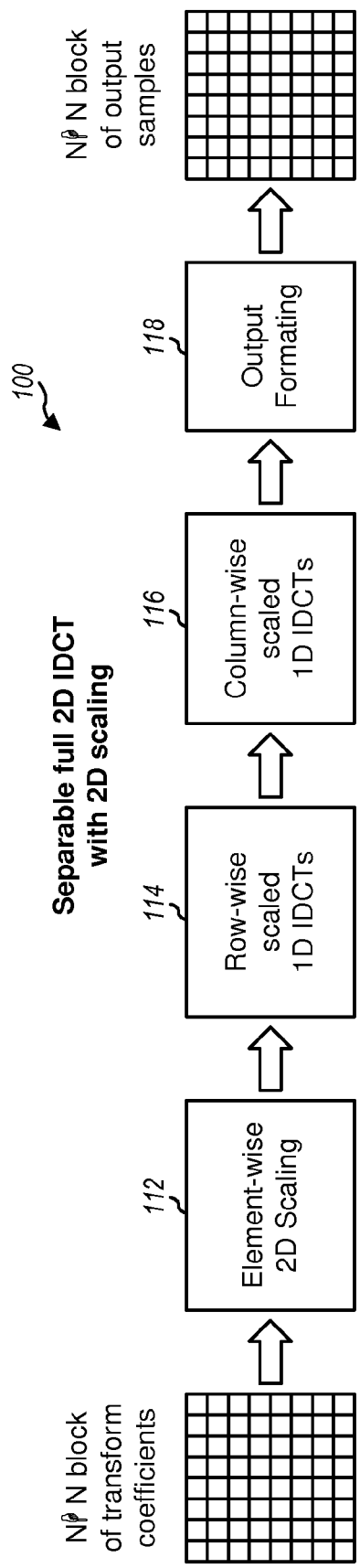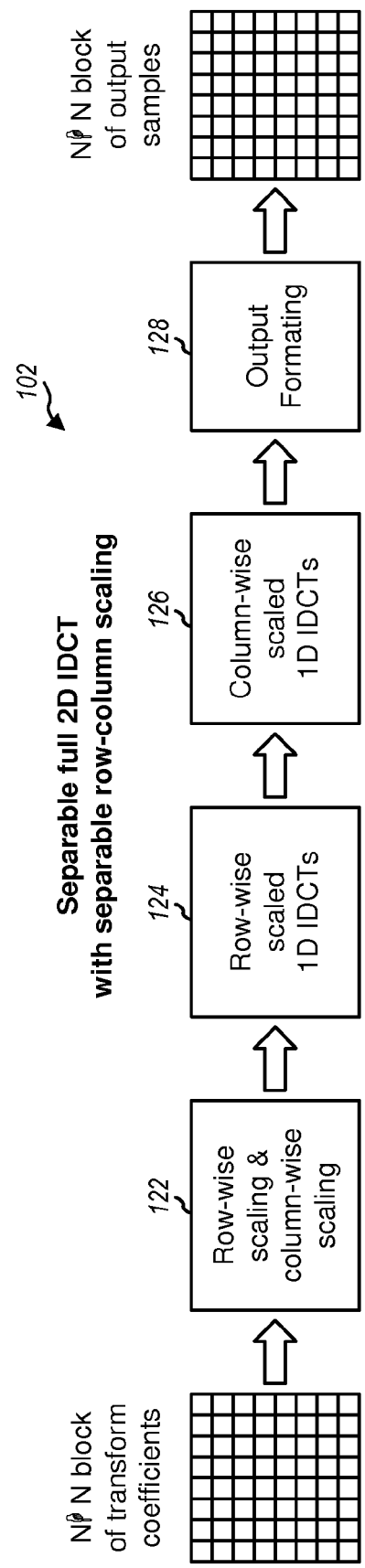

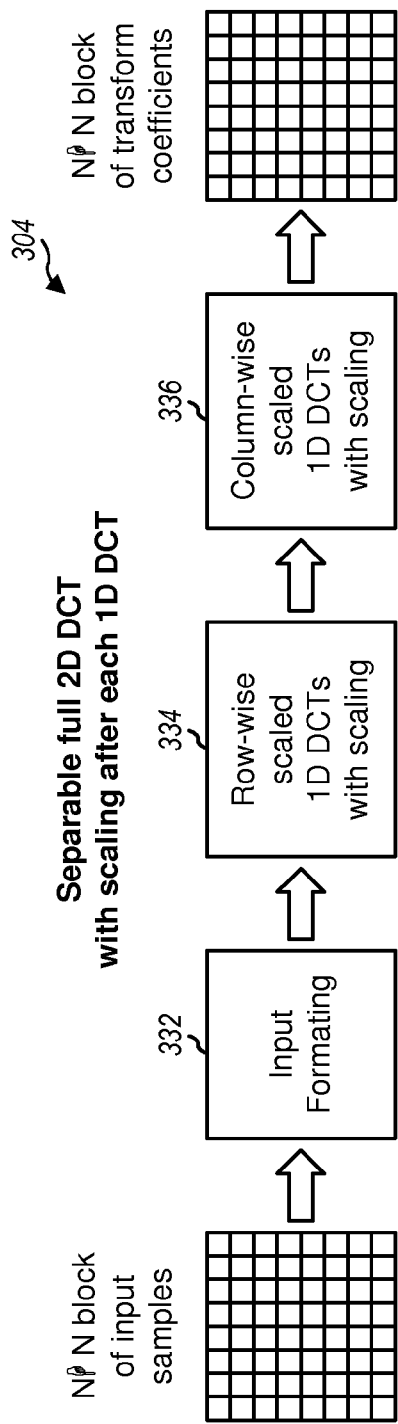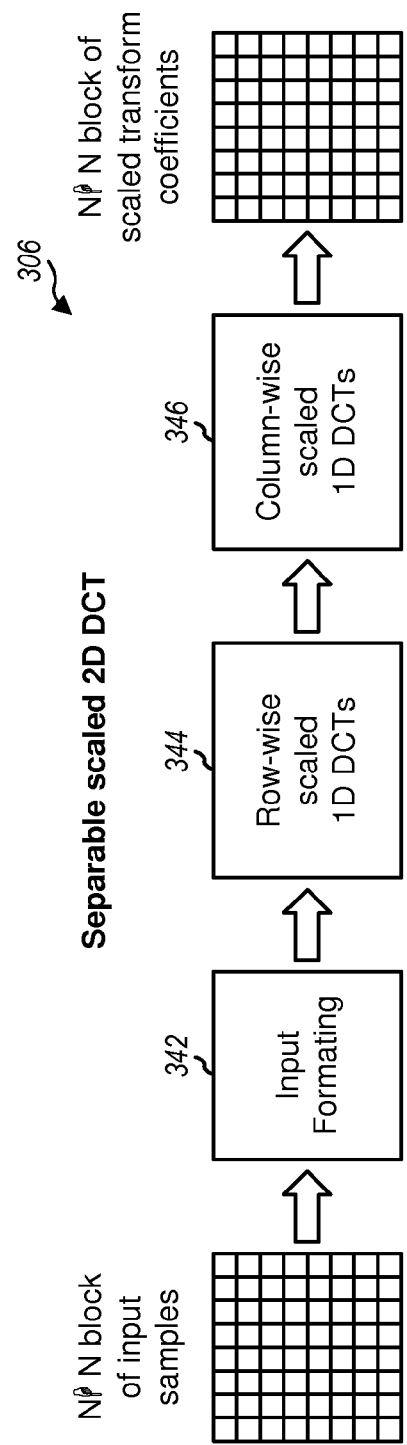
FIG. 3C
FIG. 3D

TRANSFORM DESIGN WITH SCALED AND NON-SCALED INTERFACES

The present application for patent is a Continuation of U.S. patent application Ser. No. 11/691,268, entitled "TRANSFORM DESIGN WITH SCALED AND NON-SCALED INTERFACES," filed on Mar. 26, 2007, which claims priority to provisional U.S. Application Ser. No. 60/787,562, entitled "CONVERGENCE OF SCALED AND NON-SCALED IDCT ARCHITECTURES," filed Mar. 29, 2006, assigned to the assignee hereof and incorporated herein by reference.

BACKGROUND

Field

The present disclosure relates generally to processing, and more specifically to techniques for performing transform on data.

Background

Transforms are commonly used to convert data from one domain to another domain. For example, discrete cosine transform (DCT) is commonly used to transform data from spatial domain to frequency domain, and inverse discrete cosine transform (IDCT) is commonly used to transform data from frequency domain to spatial domain. DCT is widely used for image/video compression to spatially decorrelate blocks of picture elements (pixels) in images or video frames. The resulting transform coefficients are typically much less dependent on each other, which makes these coefficients more suitable for quantization and encoding. DCT also exhibits energy compaction property, which is the ability to map most of the energy of a block of pixels to only few (typically low order) transform coefficients. This energy compaction property can simplify the design of encoding algorithms.

Transforms such as DCT and IDCT may be used for various applications that may support different image and video coding standards. Hence, it is desirable to provide interfaces that can receive and provide data in formats suitable for these applications. Furthermore, since transforms may be performed on large quantity of data, it is desirable to perform transforms as efficiently as possible.

SUMMARY

Techniques for efficiently performing full and scaled transforms on data received via full and scaled interfaces, respectively, are described herein. A full transform is a transform that implements the complete mathematical description of the transform. A full transform operates on or provides full transform coefficients (or simply, transform coefficients). A full transform may also be referred to as a non-scaled transform, a complete transform, etc. A scaled transform is a transform that operates on or provides scaled transform coefficients, which are scaled versions of the full transform coefficients. The scaled transform may have lower computational complexity and may be used by applications that can accept scaled transform coefficients. The full transform may be used by applications that desire to exchange full transform coefficients. The full and scaled transforms may be for a two-dimensional (2D) IDCT, which may be implemented in a separable manner with one-dimensional (1D) IDCTs. The full and scaled transforms may also be for a 2D DCT, which may be implemented in a separable manner with 1D DCTs. The 1D IDCTs and 1D DCTs may be implemented in a computationally efficient manner, as described below.

For certain implementations, these techniques for efficiently performing full and scaled transforms on data received via full and scaled interfaces, respectively, may comprise: receiving a block of input sample values via an interface; performing a full 2D inverse transform on the block of input values to obtain a block of output values, comprising: performing a scaled 1D transform on each row of the block of input sample values to obtain a first intermediate block, performing a scaled 1D transform on each column of the first intermediate block to obtain a second intermediate block comprising scaled transform coefficients, and scaling the second intermediate block to obtain a block of output values; and outputting the block of scaled transform coefficients and the block of output values.

For certain alternative implementations, these techniques for efficiently performing full and scaled transforms on data received via full and scaled interfaces, respectively, may comprise: receiving a block of first input values via a first interface; performing a first transform on the block of first input values to obtain a block of first output values, comprising: scaling the block of first input values to obtain a block of scaled input values, performing a scaled one-dimensional (1D) transform on each row of the block of scaled input values to obtain an intermediate block, and performing a scaled 1D transform on each column of the intermediate block to obtain first output values; receiving a block of second input values via a second interface; and performing a second transform on the block of second input values to obtain a block of second output values, comprising: performing a scaled one-dimensional (1D) transform on each row of the block of second input sample values to obtain a second intermediate block, performing a scaled 1D transform on each column of the second intermediate block to obtain a third intermediate block, and scaling the third intermediate block to obtain a block of second output values.

Various aspects and features of the disclosure are described in further detail below.

BRIEF DESCRIPTION OF THE DRAWINGS

FIG. 1A shows a separable full 2D IDCT with 2D scaling.

FIG. 1B shows a separable full 2D IDCT with row-column scaling.

FIG. 3C shows a separable full 2D DCT with 1D scaling.

FIG. 3D shows a separable scaled 2D DCT.

DETAILED DESCRIPTION

Figure 1C:
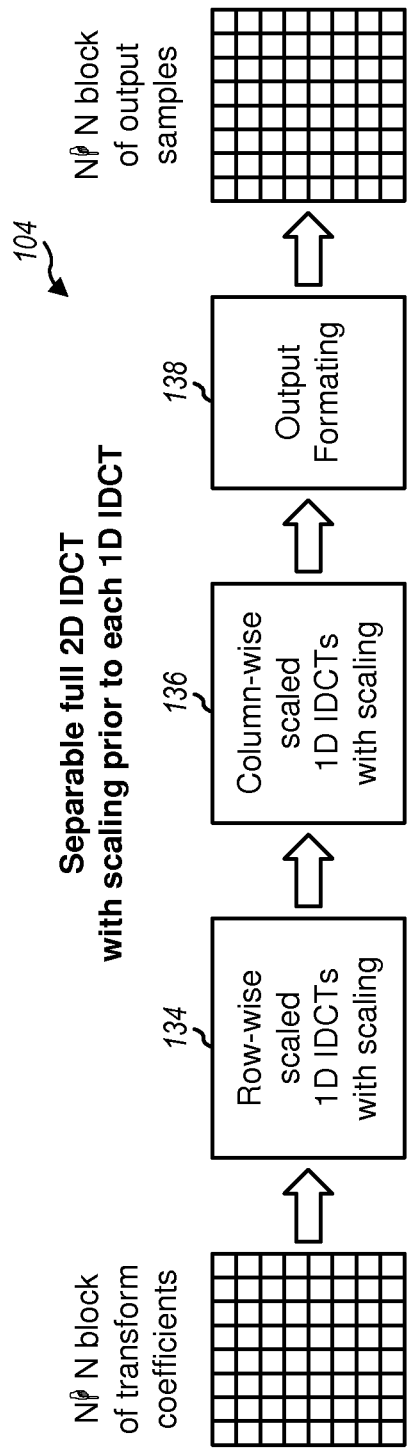
FIG. 1C shows a separable full 2D IDCT with 1D scaling.

The techniques described herein may be used for various types of transforms such as DCT, IDCT, discrete Fourier transform (DFT), inverse DFT (IDFT), modulated lapped transform (MLT), inverse MLT, modulated complex lapped transform (MCLT), inverse MCLT, etc. The techniques may also be used for various applications such as image, video, and audio processing, communication, computing, data networking, data storage, graphics, etc. In general, the techniques may be used for any application that uses a transform. For clarity, the techniques are described below for DCT and IDCT, which are commonly used in image and video processing.

An N-point 1D DCT and an N-point 1D IDCT of type II may be defined as follows:

$$X[k] = \frac{c(k)}{2} \cdot \sum_{n=0}^{N-1} x[n] \cdot \cos\frac{(2n+1)\cdot k\pi}{2N}, \quad \text{Eq (1)}$$

and $$x[n] = \sum_{k=0}^{N-1} \frac{c(k)}{2} \cdot X[k] \cdot \cos\frac{(2n+1)\cdot k\pi}{2N}, \quad \text{Eq (2)}$$

where $$c(k) = \begin{cases} 1/\sqrt{2} & \text{if } k=0 \\ 1 & \text{otherwise} \end{cases},$$

x[n] is a 1D spatial domain function, and
X[k] is a 1D frequency domain function.

The 1D DCT in equation (1) operates on N input samples or spatial domain values x[0] through x[N−1] and generates N transform coefficients X[0] through X[N−1]. The 1D IDCT in equation (2) operates on N transform coefficients and generates N output samples. Type II DCT is one type of transform and is commonly believed to be one of the most efficient transforms among various energy compacting transforms often proposed for image/video compression.

The 1D DCT and 1D IDCT may be implemented in their original forms shown in equations (1) and (2), respectively. However, substantial reduction in computational complexity may be realized by finding factorizations that result in as few multiplications and additions as possible, as described below.

The 1D DCT in equation (1) may be expressed in matrix form, as follows:

$$\underline{x} = \underline{T}\underline{y}, \quad \text{Eq (3)}$$

where
$\underline{y}$ is an N×1 vector of input samples,
$\underline{T}$ is an N×N matrix of a full 1D DCT, and
$\underline{x}$ is an N×1 vector of transform coefficients.

$\underline{y}$ contains input samples x[0] through x[N−1], and $\underline{x}$ contains transform coefficients X[0] through X[N−1]. The elements of $\underline{T}$ may be obtained based on equation (1).

The 1D DCT may be factored into a product of matrices, as follows:

$$\underline{T} = \underline{S}\underline{T}_S, \quad \text{Eq (4)}$$

where
$\underline{S} = \text{diag}(A_0, \ldots, A_{N-1})$ is a diagonal matrix of scale factors, and
$\underline{T}_S$ is an N×N matrix of a scaled 1D DCT.

Equations (3) and (4) indicate that a full 1D DCT may be performed on $\underline{y}$ by first performing a scaled 1D DCT on $\underline{y}$ and then scaling the results with $\underline{S}$.

An advantage of decomposing a full transform into a scaled transform and a scaling operation, e.g., as shown in equation (4), is that by properly choosing the scale factors, the multiplicative complexity of the scaled transform may be reduced. For example, a well-known decomposition of Arai, Agui, and Nakajima (AAN) in "A Fast DCT-SQ Scheme for Images," Transactions of the IEICE, November 1988, produces a scaled 8-point DCT that may be implemented with only five multiplications by irrational factors. In contrast, the best-known full 8-point DCT requires 11 such multiplications.

An N×N 2D DCT may be defined as follows:

$$\underline{T}(\underline{x})\underline{T} = (\underline{S}\underline{T}_S)(\underline{x})(\underline{S}\underline{T}_S) = (\underline{S}(\underline{x})\underline{S})(\underline{T}_S(\underline{x})\underline{T}_S), \quad \text{Eq (5)}$$

where
$\underline{T}(\underline{x})\underline{T}$ is a Kroneker product of $\underline{T}$ with itself and is a matrix of a full 2D DCT,
$\underline{T}_S(\underline{x})\underline{T}_S$ is a matrix of a scaled 2D DCT, and
$\underline{S}(\underline{x})\underline{S}$ is a matrix of scale factors for the scaled 2D DCT.

The result of the operation in equation (5) is a matrix of an N×N 2D DCT.

A 2D DCT may be performed on an N×N matrix of input samples $\underline{Y}$ in a separable manner, for one dimension at a time. For example, a 1D DCT may be performed on each row of $\underline{Y}$ to obtain an intermediate matrix, and a 1D DCT may then be performed on each column of the intermediate matrix. Alternatively, a 1D DCT may be performed on each column of $\underline{Y}$ followed by a 1D DCT on each row of the intermediate matrix.

Equation (5) indicates that a 2D DCT may be performed on $\underline{Y}$ by first performing a scaled 2D DCT on $\underline{Y}$ and then scaling the results. Equation (5) also indicates that the scaling for the row and column 1D DCTs may be merged into a single step (which is matrix product by $\underline{S}(\underline{x})\underline{S}$) applied to the results of the scaled 2D DCT.

The 1D IDCT in equation (2) may be expressed in matrix form, as follows:

$$\underline{T}^{-1} = \underline{T}^t = \underline{T}_S^t \underline{S}, \quad \text{Eq (6)}$$

where $\underline{T}^t$ is an N×N matrix of a full 1D IDCT and "$^t$" denotes the transpose.

A 2D IDCT may be expressed as:

$$(\underline{T}(\underline{x})\underline{T})^{-1} = \underline{T}^{-1}(\underline{x})\underline{T}^{-1} = (\underline{T}_S^t \underline{S})x(\underline{T}_S^t \underline{S}) = (\underline{T}_S^t(\underline{x})\underline{T}_S^t)(\underline{S}(\underline{x})\underline{S}). \quad \text{Eq (7)}$$

Equation (7) indicates that a 2D IDCT may be performed on an N×N matrix of transform coefficients $\underline{X}$ by first scaling the transform coefficients and then performing a scaled 2D IDCT on the scaled transform coefficients. Equation (7) also indicates that the scaling for the row and column 1D IDCTs may be merged into a single step preceding the scaled 2D IDCT.

A scaled architecture is a design that uses a scaled transform, and a full architecture is a design that uses a full transform. A scaled architecture may have lower multiplicative complexity than a full architecture. For example, a scaled architecture may perform a scaled 2D IDCT ($T^t_S (\underline{x}) T^t_S$) in a separable row-column fashion and may use an 8-point scaled 1D IDCT $T_S$ from the AAN decomposition for each row and each column. The multiplicative complexity of this scaled architecture may be 8*8+16*5=64+80=144, or 64 multiplications for scaling and 5 multiplications for each of the 8 rows and 8 columns. In certain situations, the scaling may be combined with quantization, in which case the multiplicative complexity of the scaled architecture may be reduced to about 80 multiplications. A full architecture may perform a 2D IDCT (T$(\underline{x})$T) in a row-column fashion and may use the best-known full 8-point 1D IDCT T for each row and each column. The multiplicative complexity of this full architecture may be 16*11=176, or 11 multiplications for each of the 8 rows and 8 columns. For the separable implementation, the scaled architecture may have lower multiplicative complexity than the full architecture.

Figure 8:
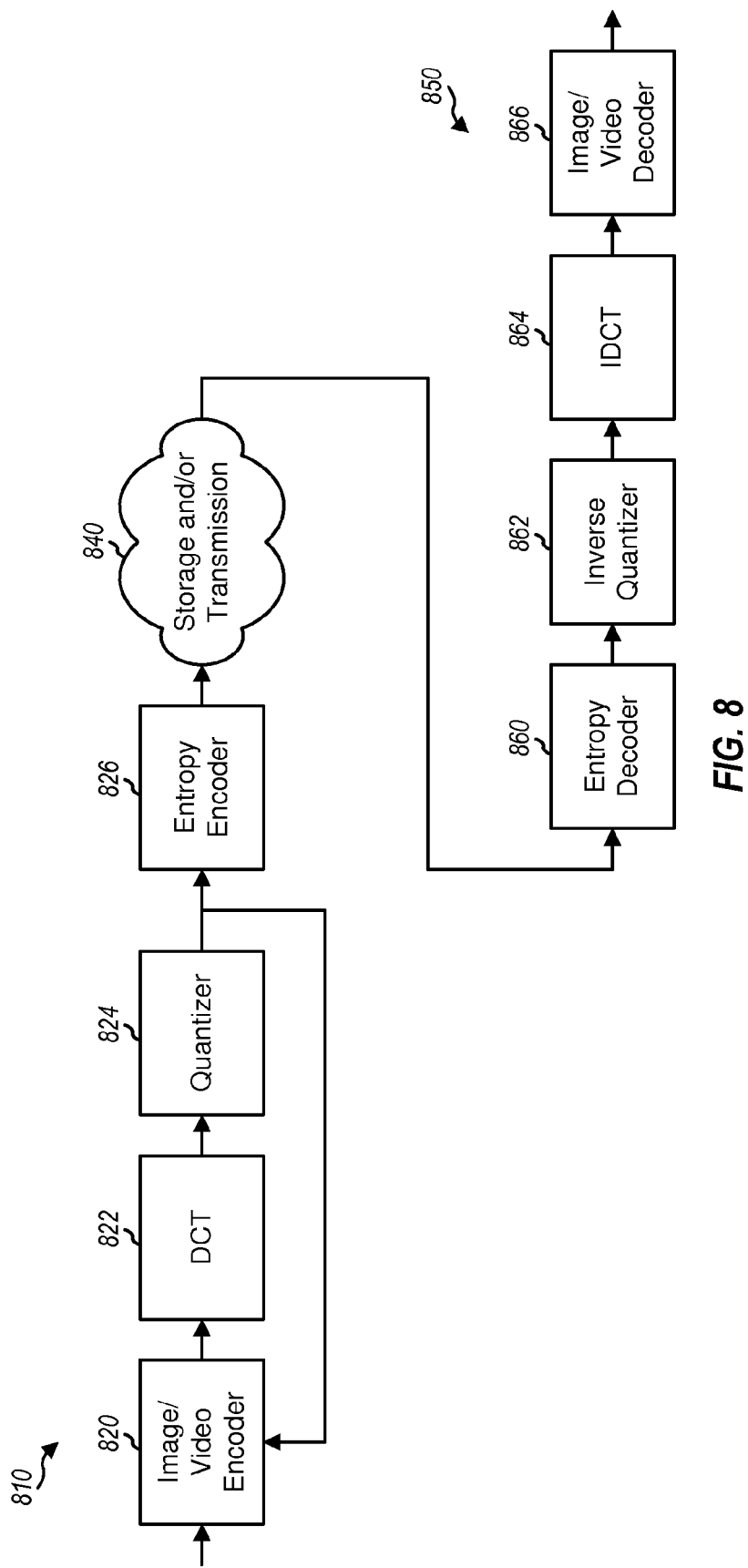
FIG. 8 shows an encoding system and a decoding system.

A scaled architecture may be used in designs that favor low complexity. The scaled architecture may be advantageous when there are only few non-zero transform coefficients to scale, which may often be the case for 2D IDCT in an image/video decoder. The scaled architecture may also be advantageous in designs that allow the scaling of transform coefficients to be combined with quantization and/or inverse quantization in an image/video encoder/decoder (codec), e.g., as shown in FIG. 8.

A full architecture may be desirable in designs that favor ease of use. For example, many computing environments and applications may support multiple image and video coding standards. In these instances, it may be more convenient to have a transform engine that implements full transform and to provide a flexible input/output interface to allow the transform engine to be used with various quantizers and codecs. The full architecture may provide simple interface and may be more suitable in such environments.

A transform design that can flexibly support different applications via scaled and full interfaces are described herein. The transform design may receive full input values via the full interface, perform a full transform on these input values, and provide full output values, similar to the full architecture. The transform design may also receive scaled input values via the scaled interface, perform a scaled transform on these input values, and provide scaled output values, similar to the scaled architecture. The transform design may internally implement a separable scaled transform to potentially achieve lower complexity and/or improved precision. The transform design may thus be able to achieve lower complexity for certain applications, provide ease of use for other applications, or provide both lower complexity and ease of use in certain instances. The transform design may be used for both forward transforms (e.g., DCT) and inverse transforms (e.g., IDCT). For clarity, the transform design is specifically described below for IDCT.

The scaled and non-scaled/full 2D IDCT architectures may be expressed as follows.

$$\text{scaled 2D IDCT}: \underline{T}^{-1}(\underline{x})\underline{T}^{-1} = (\underline{T}_S^t(\underline{x})\underline{T}_S^t)(\underline{S}(\underline{x})\underline{S}), \text{ and} \quad \text{Eq (8)}$$

$$\text{non-scaled 2D IDCT}: \underline{T}^{-1}(\underline{x})\underline{T}^{-1} = (\underline{T}_S^t\underline{S})\underline{x}(\underline{T}_S^t\underline{S}). \quad \text{Eq (9)}$$

A full/non-scaled interface may receive transform coefficients. A full 2D IDCT may be performed on these transform coefficients, as follows:

$$\underline{Y} = \Theta(\underline{X}) \approx \underline{T}^t\underline{X}\underline{T}, \quad \text{Eq (10)}$$

where $\underline{X}$ is a matrix of transform coefficients, $\Theta(.)$ is an approximation of the full 2D IDCT, and $\underline{Y}$ is a matrix of output samples.

The operator notation (.) in equation (10) is used to indicate that fixed-point approximations may not be based solely on linear operations.

The full 2D IDCT may be achieved by performing a full 1D IDCT on each row and each column of $\underline{X}$, as follows:

$$\theta(\underline{x}_i) \approx \underline{T}^t\underline{x}_i, \quad \text{Eq (11)}$$

where $\underline{x}_i$ is the i-th row or column of $\underline{X}$, and $\theta(.)$ is an approximation of the full 1D IDCT.

$\theta(.)$ may be used for row-column implementation of 2D operator $\Theta(.)$.

A scaled interface may receive scaled transform coefficients, which may be obtained as follows:

$$\underline{X}_S = \Sigma(\underline{X}) \approx \underline{S}^t\underline{X}\underline{S}, \quad \text{Eq (12)}$$

where $\Sigma(.)$ is an approximation of the 2D scaling operation, and $\underline{X}_S$ is a matrix of scaled transform coefficients.

A scaled 2D IDCT may be performed on the scaled transform coefficients, as follows:

$$\underline{Y} = \Xi(\underline{X}_S) = \underline{T}_S^t\underline{X}_S\underline{T}_S, \quad \text{Eq (13)}$$

where $\Xi(.)$ is an approximation of the scaled 2D IDCT.

The scaled 2D IDCT may be achieved by performing a scaled 1D IDCT on each row and each column of $\underline{X}_S$, as follows:

$$\xi(\underline{x}_{S,i}) \approx \underline{T}_S^t\underline{x}_{S,i}, \quad \text{Eq (14)}$$

where $\underline{x}_{S,i}$ is the i-th row or column of $\underline{X}_S$, and $\xi(.)$ is an approximation of the scaled 1D IDCT.

$\xi(.)$ may be used for row-column implementation of 2D operator $\Xi(.)$.

As shown in equation (13), the scaled interface may be realized by implementing the 2D operator $\Xi(.)$. As shown in equations (12) and (13), the full interface may be realized by implementing the 2D scaling operator $\Sigma(.)$ in addition to the 2D operator $\Xi(.)$. The full 2D IDCT may then be performed as follows:

$$\underline{Y} = \Xi(\Sigma(\underline{X})) =: \Theta(\underline{X}). \quad \text{Eq (15)}$$

Equation (15) indicates that a full 2D IDCT may be performed on full transform coefficients $\underline{X}$ by first scaling these transform coefficients with the 2D scaling operator $\Sigma(.)$ and then performing a scaled 2D IDCT on the scaled transformed coefficients with the 2D operator $\Xi(.)$. The 2D operator $\Xi(.)$ may, in turn, be implemented by a row-column cascade of 1D operators $\xi(.)$.

The 2D operator $\Theta(.)$ for a separable full 2D IDCT may thus be implemented with the 2D operator $\Xi(.)$ for a separable scaled 2D IDCT and the 2D scaling operator $\Sigma(.)$. The 2D scaling may be implemented in various manners, as described below. The resulting complexity and performance of the separable full 2D IDCT implemented with separable scaled 2D IDCT and 2D scaling may be comparable with a natively implemented full 2D IDCT.

FIG. 1A shows a design of a separable full 2D IDCT 100 with 2D scaling. 2D IDCT 100 comprises a 2D scaling stage 112, followed by a scaled 1D IDCT stage 114 for rows (or columns), further followed by a scaled 1D IDCT stage 116 for columns (or rows), and concluding with an output formatting stage 118. 2D scaling stage 112 receives an N×N block of transform coefficients $\underline{X}$ and may multiply each transform coefficient $X_{ij}$ by a scale factor $A_{ij}$ and further shift each scaled transform coefficient by P bits to the left, where P denotes the number of reserved "mantissa" bits. After the scaling, a quantity of $C=2^{P-1}$ may be added to the DC transform coefficient to achieve the proper rounding in the output samples. To improve precision of scaling, S=P+R bits may be used in the conversion of the scale factors to integers, and right shifts by R bits may be performed after multiplications. S may be any suitable value that can facilitate implementations on hardware platforms, e.g., S may be 15 or 16 for platforms with signed/unsigned 16-bit multipliers.

IDCT stage 114 performs an N-point scaled 1D IDCT on each row of the block of scaled transform coefficients from 2D scaling stage 112. IDCT stage 116 performs an N-point scaled 1D IDCT on each column of an intermediate block generated by IDCT stage 114. The scaled 1D IDCTs for stages 114 and 116 may operate directly on their input data without doing any internal pre- or post scaling. After all of the rows and columns are processed, output formatting stage 118 may shift the resulting quantities from IDCT stage 116 by P bits to the right to generate an N×N block of output samples $\underline{Y}$ for the full 2D IDCT. The scale factors and the precision constant P may be chosen such that the entire 2D IDCT may be implemented using registers of the desired width.

The 2D scaling in stage 112 may be expressed as:

$$X_{S,ij} = (X_{ij} \cdot A_i \cdot A_j) >> R, \qquad \text{Eq (16)}$$

where $X_{ij}$ is a transform coefficient in the i-th row and j-th column of $\underline{X}$, $A_i$ and $A_j$ are the i-th and j-th diagonal elements, respectively, of $\underline{S}$, $X_{S,ij}$ is a scaled transform coefficient in the i-th row and j-th column of $\underline{X}_S$, and ">>R" denotes a signed right shift operation by R bits. R is a constant ensuring P bits of added fixed-point precision in scaled transform coefficients $X_{S,ij}$.

A table may store scale factors $A_{ij} = A_i \cdot A_j$, for i=0, . . . , N−1 and j=0, . . . , N−1. Each element of $\underline{X}$ may be multiplied by a corresponding scale factor in the table. Up to N·N multiplications may be performed for the N·N elements of $\underline{X}$.

FIG. 1B shows a design of a separable full 2D IDCT 102 with separable row-column scaling. 2D IDCT 102 comprises a separable row-column scaling stage 122, followed by a scaled 1D IDCT stage 124 for rows (or columns), further followed by a scaled 1D IDCT stage 126 for columns (or rows), and concluding with an output formatting stage 128. Scaling stage 122 receives an N×N block of transform coefficients $\underline{X}$ and may multiply each transform coefficient $X_{ij}$ in each row i by a scale factor $A_i$ and then multiply each resultant coefficient in each column j by a scale factor $A_j$ to obtain scaled transform coefficients, as follows:

$$X'_{ij} = X_{ij} \cdot A_i,$$

$$X_{S,ij} = (X'_{ij} \cdot A_j) >> R. \qquad \text{Eq (17)}$$

Scaling stage 122 may thus perform 2D scaling in a separable manner on rows followed by columns (or on columns followed by rows). Separable row-column scaling may allow the same hardware to be used for scaling of rows and scaling of columns, which may reduce implementation complexity. Up to 2·N·N multiplications may be performed for the N·N elements of $\underline{X}$. However, the actual number of multiplications may be much fewer than 2·N·N since some of the scale factors $A_0$ through $A_{N-1}$ may have trivial values (e.g., 256), and multiplication with these trivial scale factors may be implemented with simple shift operations. Stages 124, 126, and 128 may operate in the same manner as stages 114, 116, and 118, respectively, in FIG. 1A.

FIG. 1C shows a design of a separable full 2D IDCT 104 with scaling prior to each scaled 1D IDCT. 2D IDCT 104 comprises a scaled 1D IDCT with scaling stage 134 for rows (or columns), followed by a scaled 1D IDCT with scaling stage 136 for columns (or rows), and concluding with an output formatting stage 138. IDCT stage 134 performs scaling prior to an N-point scaled 1D IDCT on each row of a block of transform coefficients. IDCT stage 136 performs scaling prior to an N-point scaled 1D IDCT on each column of an intermediate block generated by IDCT stage 134. Stages 134 and 136 essentially perform full 1D IDCTs using scaled 1D IDCTs. The scale factors $A_0$ through $A_{N-1}$ and the constant factors within the scaled 1D IDCT may be selected to reduce complexity and/or improve precision for the full 1D IDCT, as described below. Stage 138 may operate in the same manner as stage 118 in FIG. 1A.

Figure 1D:
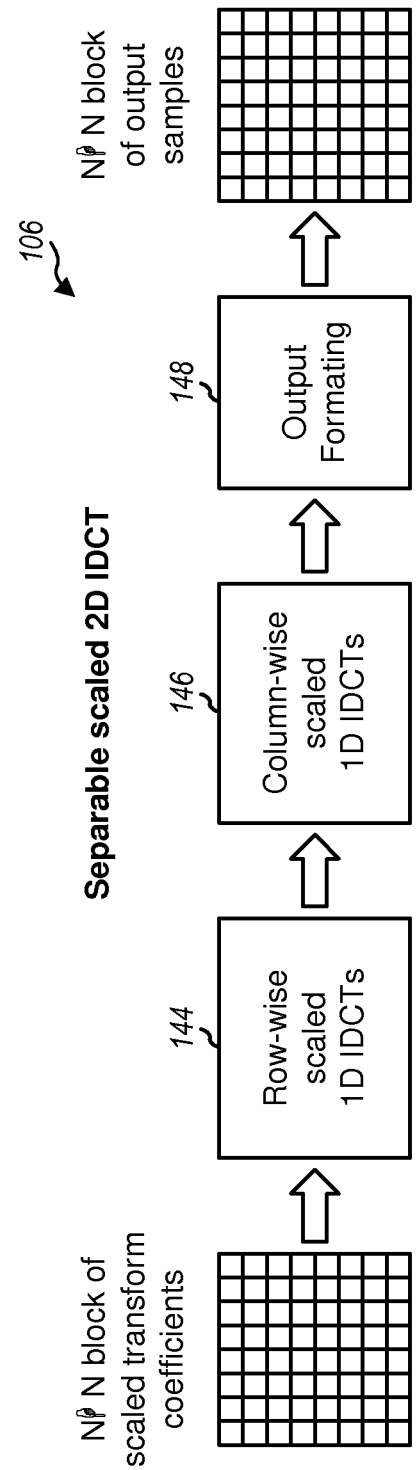
FIG. 1D shows a separable scaled 2D IDCT.

FIG. 1D shows a design of a separable scaled 2D IDCT 106. 2D IDCT 106 comprises a scaled 1D IDCT stage 144 for rows (or columns), followed by a scaled 1D IDCT stage 146 for columns (or rows), and concluding with an output formatting stage 148. IDCT stage 144 performs an N-point scaled 1D IDCT on each row of an N×N block of scaled transform coefficients $\underline{X}_S$. IDCT stage 146 performs an N-point scaled 1D IDCT on each column of an intermediate block generated by IDCT stage 144. Stage 148 may operate in the same manner as stage 118 in FIG. 1A.

As shown in FIGS. 1A to 1C, the scaling for the full 2D IDCT may be achieved in various manners such as with 2D scaling prior to the row-column 1D IDCTs in FIG. 1A, with separable row-column scaling prior to the row-column 1D IDCTs in FIG. 1B, or with scaling prior to each 1D IDCT in FIG. 1C. The scaling may also be performed in other manners. As shown in FIG. 1D, the scaled 2D IDCT may be achieved by simply omitting the scaling and performing 1D IDCTs for rows and columns.

Various types of scaled 1D IDCT may be used for the row-column 1D IDCTs in FIGS. 1A to 1D. For example, a scaled 1D IDCT based on the AAN decomposition may be used. Another scaled IDCT with possibly lower complexity is described below.

Figure 2:
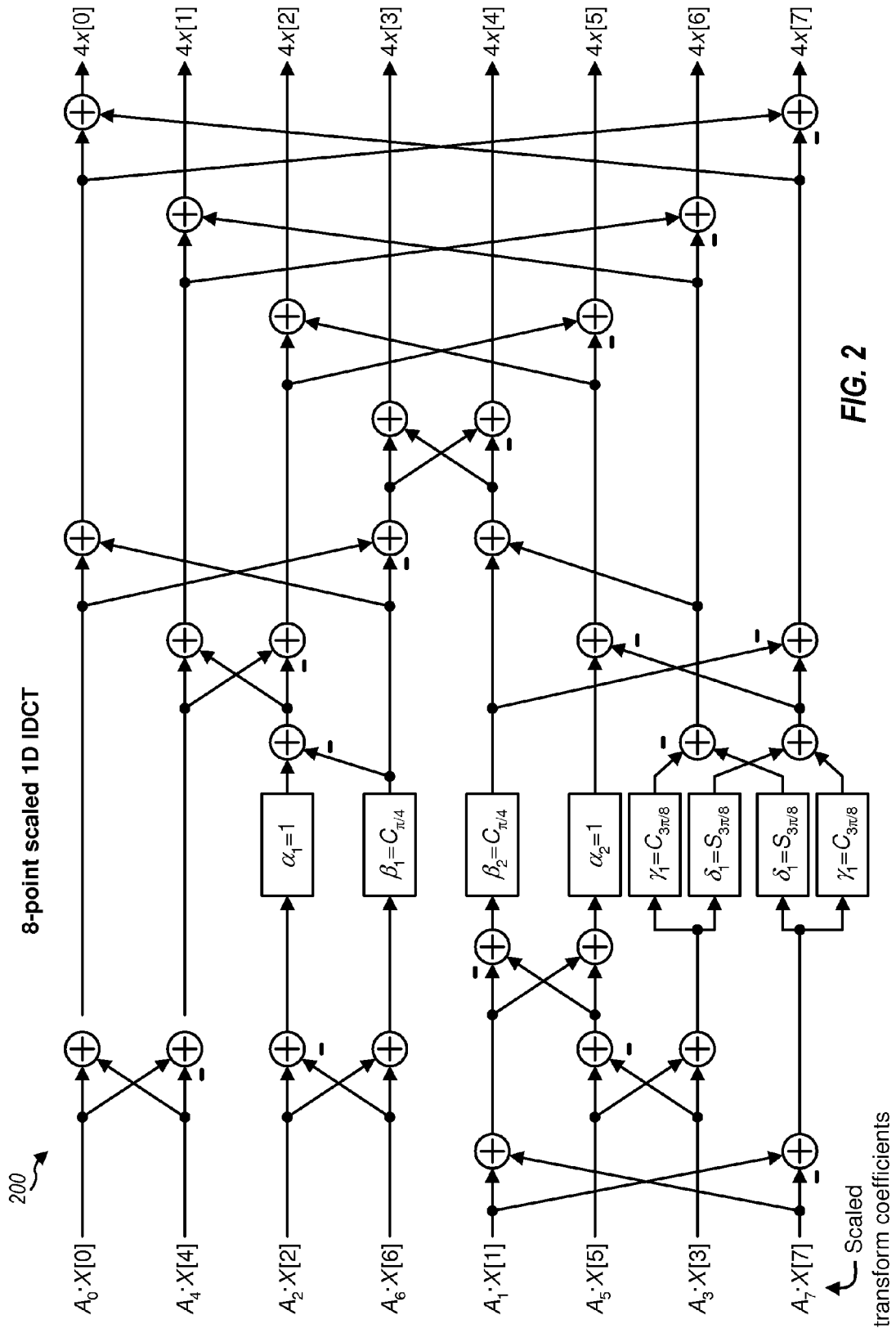
FIG. 2 shows a flow graph of a factorization of an 8-point 1D IDCT.

FIG. 2 shows a flow graph 200 of an example factorization of an 8-point 1D IDCT. In flow graph 200, each addition is represented by symbol "β" and each multiplication is represented by a box. Each addition sums or subtracts two input values and provides an output value. Each multiplication multiplies an input value with a constant factor shown inside the box and provides an output value. The factorization in FIG. 2 has multiplications with the following constant factors:

$$\alpha_1 = \alpha_2 = 1,$$

$$\beta_1 = \beta_2 = C_{\pi/4} = \cos(\pi/4) \approx 0.707106781$$

$$\beta_1 = C_{3\pi/8} = \cos(3\pi/8) \approx 0.382683432, \text{ and}$$

$$\delta_1 = S_{3\pi/8} = \sin(3\pi/8) \approx 0.923879533. \qquad \text{Eq (18)}$$

Flow graph 200 may receive eight transform coefficients X[0] through X[7] and scale these transform coefficients with scale factors $A_0$ through $A_7$ to obtain eight scaled transform coefficients $A_0 \cdot X[0]$ through $A_7 \cdot X[7]$. Alternatively, flow graph 200 may receive the eight scaled transform coefficients directly. In either case, flow graph 200 performs an 8-point 1D IDCT on the eight scaled transform coefficients and generates eight output samples x[0] through x[7]. The scale factors $A_0$ through $A_7$ are as follows:

$$A_0 = \frac{1}{2\sqrt{2}} \approx 0.3535533906,$$

$$A_1 = \frac{\cos(7\pi/16)}{2\sin(3\pi/8) - \sqrt{2}} \approx 0.4499881115,$$

-continued $$A_2 = \frac{\cos(\pi/8)}{\sqrt{2}} \approx 0.6532814824,$$

$$A_3 = \frac{\cos(5\pi/16)}{\sqrt{2}+2\cos(3\pi/8)} \approx 0.2548977895,$$

$$A_4 = \frac{1}{2\sqrt{2}} \approx 0.3535533906,$$

$$A_5 = \frac{\cos(3\pi/16)}{\sqrt{2}-2\cos(3\pi/8)} \approx 1.2814577239,$$

$$A_6 = \frac{\cos(3\pi/8)}{\sqrt{2}} \approx 0.2705980501,$$

$$A_7 = \frac{\cos(\pi/16)}{\sqrt{2}+2\sin(3\pi/8)} \approx 0.3006724435.$$

Flow graph 200 includes a number of butterfly operations. A butterfly operation receives two input values and generates two output values, where one output value is the sum of the two input values and the other output value is the difference of the two input values. For example, the butterfly operation on input values $A_0 \cdot X[0]$ and $A_4 \cdot X[4]$ generates an output value $A_0 \cdot X[0] + A_4 \cdot X[4]$ for the top branch and an output value $A_0 \cdot X[0] - A_4 \cdot X[4]$ for the bottom branch.

The factorization shown in FIG. 2 results in a total of 6 multiplications and 28 additions, which are substantially fewer than the number of multiplications and additions required for direct computation of equation (2). The multiplications are with irrational constants representing the sine and cosine of different angles, which are multiples of $\pi/8$ for the 8-point 1D IDCT. An irrational constant is a constant that is not a ratio of two integers. The multiplications with irrational constants may be efficiently performed in fixed-point integer arithmetic when each irrational constant is approximated by a rational dyadic constant. A rational dyadic constant is a rational constant with a dyadic denominator and has the form $c/2^b$, where b and c are integers and b>0.

Multiplication of an integer variable x with an irrational constant μ in fixed-point integer arithmetic may be achieved by approximating the irrational constant with a rational dyadic constant, as follows:

$$\mu \approx c/2^b, \quad \text{Eq (19)}$$

where μ is the irrational constant to be approximated, and $c/2^b$ is the rational dyadic constant.

Given integer variable x and rational dyadic constant $u=c/2^b$, an integer-valued product $$y=(x \cdot c)/2^b \quad \text{Eq (20)}$$

may be approximated using a series of intermediate values $$x_0, x_1, x_2, \ldots, x_t, \quad \text{Eq (21)}$$

where $x_0=0$, $x_1=x$, and for all $2 \le i \le t$ values, $x_i$ is obtained as follows:

$$x_i = \pm x_j \pm x_k \cdot 2^{s_i}, \text{with } j,k<i, \quad \text{Eq (22)}$$

where $x_k \cdot 2^{s_i}$ implies either left or right shift (depending on the sign of constant $s_i$) of intermediate value $x_k$ by $|s_i|$ bits.

In equation (22), $x_i$ may be equal to $x_j + x_k \cdot 2^{s_i}$, $x_j - x_k \cdot 2^{s_i}$, or $-x_j + x_k \cdot 2^{s_i}$. Each intermediate value $x_i$ in the series may be derived based on two prior intermediate values $x_j$ and $x_k$ in the series, where either $x_j$ or $x_k$ may be equal to zero. Each intermediate value $x_i$ may be obtained with one shift and/or one addition. The shift is not needed if $s_i$ is equal to zero. The addition is not needed if $x_j=x_0=0$. The total number of additions and shifts for the multiplication is determined by the number of intermediate values in the series, which is t, as well as the expression used for each intermediate value. The multiplication by rational dyadic constant u is essentially unrolled into a series of shift and add operations. The series is defined such that the final value in the series becomes the desired integer-valued product, or $$x_t \approx y. \quad \text{Eq (23)}$$

Multiplication of an integer variable x with two irrational constants μ and η in fixed-point integer arithmetic may be achieved by approximating the irrational constants with rational dyadic constants, as follows:

$$\mu \approx c/2^b \text{ and } \eta \approx e/2^d, \quad \text{Eq (24)}$$

where $c/2^b$ and $e/2^d$ are two rational dyadic constants, and b, c, d and e are integers, with b>0 and d>0.

Given integer variable x and rational dyadic constants $u=c/2^b$ and $v=e/2^d$, two integer-valued products $$y=(x \cdot c)/2^b \text{ and } z=(x \cdot e)/2^d \quad \text{Eq (25)}$$

may be approximated using a series of intermediate values $$x_0, x_1, x_2, \ldots, x_t, \quad \text{Eq (26)}$$

where $x_0=0$, $x_1=x$, and for all $2 \le i \le t$ values, $x_i$ is obtained as follows:

$$x_i = \pm x_j \pm x_k \cdot 2^{s_i}, \text{with } j,k<i. \quad \text{Eq (27)}$$

The series is defined such that the desired integer-valued products are obtained at steps m and n, as follows:

$$x_m \approx y \text{ and } x_n \approx z, \quad \text{Eq (28)}$$

where m, n≤t and either m or n is equal to t.

As shown in equations (24) through (28), the multiplication of integer variable x with irrational constants μ and η may be approximated with a common series of intermediate values generated by shift and add operations and using intermediate results to reduce the total number of operations.

In the computation described above, trivial operations such as additions and subtractions of zeros and shifts by zero bits may be omitted. The following simplifications may be made:

$$x_i = \pm x_0 \pm x_k \cdot 2^{s_i} \Rightarrow x_i = \pm x_k \cdot 2^{s_i} \quad \text{Eq (29)}$$

$$x_i = \pm x_j \pm x_k \cdot 2^0 \Rightarrow x_i = \pm x_j \pm x_k. \quad \text{Eq (30)}$$

In equation (29), the expression to the left of "⇒" involves an addition or subtraction of zero (denoted by $x_0$) and may be performed with one shift, as shown by the expression to the right of "⇒". In equation (30), the expression to the left of "⇒" involves a shift by zero bits (denoted by $2^0$) and may be performed with one addition, as shown by the expression to the right of "⇒". Equations (29) and (30) may be applied to equations (22) and (27) in the computation of $x_i$.

To reduce computation, a first common factor $F_1$ may be applied to constant factors $\alpha_1$ and $\beta_1$ in flow graph 200, and second common factor $F_2$ may be applied to constant factors $\alpha_2$, $\beta_2$, $\delta_1$ and $\gamma_1$ as follows:

$$\alpha'_1 = \alpha_1 \cdot F_1, \beta'_1 = \beta_1 \cdot F_1, \text{ and}$$

$$\alpha'_2 = \alpha_2 \cdot F_2, \beta'_2 = \beta_2 \cdot F_2, \gamma'_1 = \gamma_1 \cdot F_2, \delta'_1 = \delta_1 \cdot F_2. \quad \text{Eq (31)}$$

The scale factors $A_0$ through $A_7$ may also be scaled to account for the common factors $F_1$ and $F_2$, as follows:

$A'_0 = A_0, A'_4 = A_4,$ $A'_2 = A_2/F_2, A'_6 = A_6/F_1,$ and $A'_1 = A_1/F_2, A'_5 = A_5/F_2, A'_3 = A_3/F_2, A'_7 = A_7/F_2.$  Eq (32)

Different combinations of values for common factors $F_1$ and $F_2$ may be evaluated. For each combination of $F_1$ and $F_2$ values, the total number of logical and arithmetic operations for the 1D IDCT and the precision of the output samples may be determined.

Table 1 shows an example fixed-point approximation for the 1D IDCT in FIG. 2 with $F_1 = 2523/2048$ and $F_2 = 2607/2048$. In Table 1, the scale factors $A'_0$ through $A'_7$ and the scaled common factors are given in the first column. Each factor may be approximated with a rational dyadic constant given in the second column. The series of intermediate values for multiplication of variable x with one or two rational dyadic constants is given in the third column. The numbers of add and shift operations for each multiplication are given in the fourth and fifth columns, respectively. The number of times each multiplication is used for the 1D IDCT is given in the sixth column. The total number of add operations for the 1D IDCT is equal to the sum of the number of add operations in the fourth column times the number given in the sixth column. The total number of shift operations for the 1D IDCT is equal to the sum of the number shift operations in the fifth column times the number given in the sixth column.

IDCT stage by P bits. The design shown in Table 1 meets or exceeds precision metrics defined in IEEE Standard 1180-1190 and its pending replacement.

Table 1 shows an example fixed-point approximation for the 1D IDCT in FIG. 2. The scale factors $A_0$ through $A_7$ and the constant factors $\alpha_1$, $\beta_1$, $\alpha_2$, $\beta_2$, $\delta_1$ and $\gamma_1$ may also be approximated with other rational dyadic constants, which may have different complexity and/or precision. Other types of scaled IDCT may also be used to implement separable scaled and full 2D IDCTs.

Figure 3A:
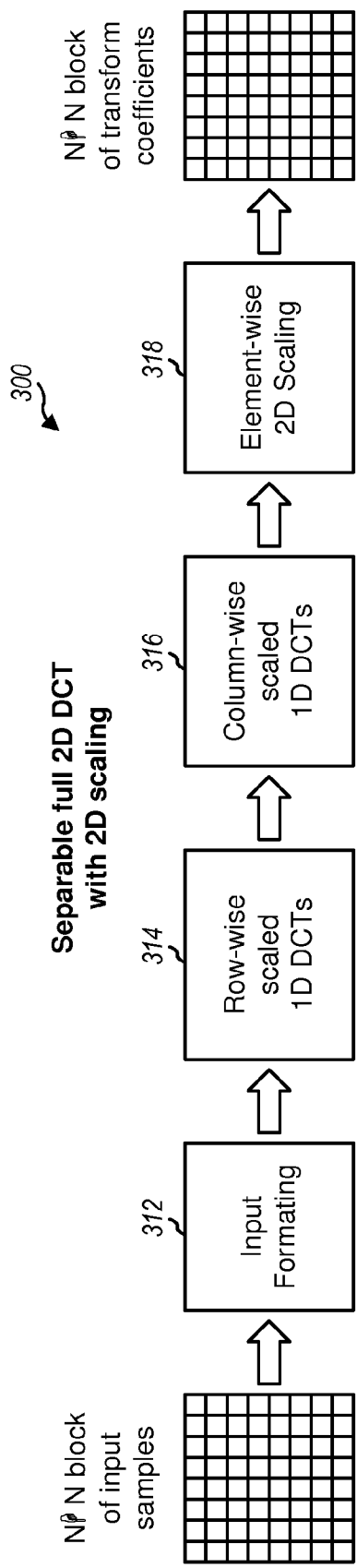
FIG. 3A shows a separable full 2D DCT with 2D scaling.

FIG. 3A shows a design of a separable full 2D DCT 300 with 2D scaling. 2D DCT 300 comprises an input formatting stage 312, followed by a scaled 1D DCT stage 314 for rows (or columns), further followed by a scaled 1D DCT stage 316 for columns (or rows), and concluding with a 2D scaling stage 318. Input formatting stage 312 may pre-multiply an N×N block of input samples. DCT stage 314 performs an N-point scaled 1D DCT on each row of a block of pre-multiplied samples from stage 312 and generates a first intermediate block. DCT stage 316 performs an N-point scaled 1D DCT on each column of the first intermediate block and generates a second intermediate block. Scaling stage 318 scales each element of the second intermediate matrix and provides a block of transformed coefficients for the full 2D DCT.

Figure 3B:
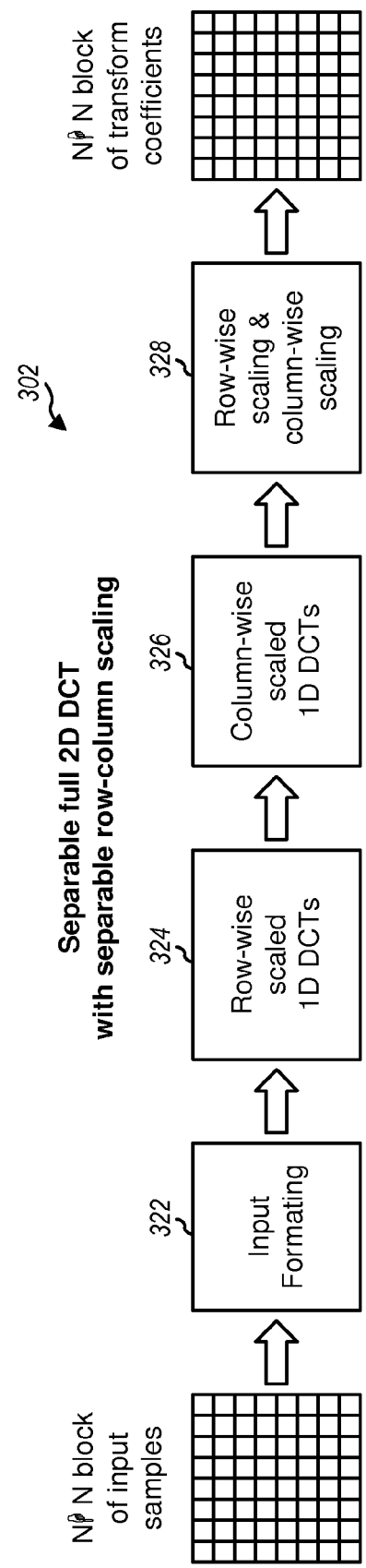
FIG. 3B shows a separable full 2D DCT with row-column scaling.

FIG. 3B shows a design of a separable full 2D DCT 302 with separable row-column scaling. 2D DCT 302 comprises

TABLE 1

| Factor | Rational Dyadic Constant | Multiplication of variable x with one or two rational dyadic constants | Num of Adds | Num of Shifts | Times Used |
|---|---|---|---|---|---|
| $A_0'$ | 256 | y = x << 8; | 0 | 1 | 1 |
| $A_1'$ | 256 | y = x << 8; | 0 | 1 | 1 |
| $A_2'$ | 384 | y = (x + (x << 1)) << 7; | 1 | 2 | 1 |
| $A_3'$ | 145 | $x_2$ = x + (x << 3); y = x + ($x_2$ << 4); | 2 | 2 | 1 |
| $A_4'$ | 256 | y = x << 8; | 0 | 1 | 1 |
| $A_5'$ | 729 | $x_2$ = x + (x << 2); $x_3$ = x + ($x_2$ << 4); y = $x_3$ + ($x_3$ << 3); | 3 | 3 | 1 |
| $A_6'$ | 159 | $x_2$ = x + (x << 2); y = ($x_2$ << 5) − x; | 2 | 2 | 1 |
| $A_7'$ | 171 | $x_2$ = (x << 1) + (x << 3); $x_3$ = x + $x_2$; y = $x_3$ + ($x_2$ << 4); | 3 | 3 | 1 |
| $\alpha_1$ | 2523/2048 | $x_2$ = x − (x >> 9); $x_3$ = $x_2$ − (x >> 4); y = $x_2$ + ($x_3$ >> 2); | 3 | 3 | 1 |
| $\beta_1$ | 223/256 | $x_2$ = x + (x >> 5); y = x − ($x_2$ >> 3); | 2 | 2 | 1 |
| $\alpha_2$ | 2607/2048 | $x_2$ = x − (x >> 6); $x_3$ = $x_2$ + (x >> 5); y = $x_3$ + ($x_3$ >> 5); | 3 | 3 | 1 |
| $\beta_2$ | 3687/4096 | $x_2$ = x + (x >> 9); $x_3$ = $x_2$ − (x >> 2); $x_4$ = $x_3$ + (x >> 4); y = $x_2$ − ($x_4$ >> 3); | 4 | 4 | 1 |
| $\gamma_1$ | 1995/4096 | $x_2$ = x + (x >> 5); $x_3$ = $x_2$ + (x >> 7); $x_4$ = $x_3$ + ($x_2$ >> 3); | 5 | 6 | 2 |
| $\delta_1$ | 4817/4096 | y = $x_4$ + ($x_2$ >> 7); z = ($x_3$ − ($x_3$ >> 4)) >> 1; | | | |
| | | Complexity of scaled 1D IDCT: | 50 | 24 | |
| | | Complexity of full 1D IDCT: | 61 | 39 | |

In Table 1, right shift by 8 cancels out multiplication by a factor of 256 in scale factors $A'_0$, $A'_1$, $A'_2$, and $A'_4$, which enables additional complexity reduction.

In the design shown in Table 1, an 8-point scaled 1D IDCT may be performed with 50 add operations and 24 shift operations. An 8-point full 1D IDCT may be performed with 61 add operations and 39 shift operations. The scaling with scale factors $A'_0$ through $A'_7$ may be performed prior to the scaled 1D IDCT (as shown in FIG. 1C) or may be performed prior to the row-column 1D IDCTs (as shown in FIGS. 1A and 1B). An 8×8 full 2D IDCT may be performed with 977 add operations and 688 shift operations. The 977 add operations include 61 adds for each of 16 1D IDCTs for the 8 rows and 8 columns plus 1 add to sum $2^{P-1}$ with the DC transform coefficient after scaling. The 688 shift operations include 39 shifts for each of 16 IDCTs for the 8 rows and 8 columns plus 64 shifts to shift the 64 values from the second an input formatting stage 322, followed by a scaled 1D DCT stage 324 for rows (or columns), further followed by a scaled 1D DCT stage 326 for columns (or rows), and concluding with a separable row-column scaling stage 328. Stages 322, 324 and 326 may operate in the same manner as stages 312, 314 and 316, respectively, in FIG. 3A. Scaling stage 328 may scale the second intermediate block from DCT stage 326 row-wise and then column-wise to generate the block of transformed coefficients for the full 2D DCT.

FIG. 3C shows a design of a separable full 2D DCT 304 with scaling after each scaled 1D DCT. 2D DCT 304 comprises an input formatting stage 332, followed by a scaled 1D DCT with scaling stage 334 for rows (or columns), and further followed by a scaled 1D DCT with scaling stage 336 for columns (or rows). Stage 332 may operate in the same manner as stage 312 in FIG. 3A. DCT stage 334 performs an N-point scaled 1D DCT followed by scaling on each row of a block of pre-multiplied samples from stage 332. DCT stage 336 performs an N-point scaled 1D DCT followed by scaling on each column of an intermediate block generated by DCT stage 334.

FIG. 3D shows a design of a separable scaled 2D DCT 306. 2D DCT 306 comprises an input formatting stage 342, followed by a scaled 1D DCT stage 344 for rows (or columns), and further followed by a scaled 1D DCT stage 346 for columns (or rows). Stage 342 may operate in the same manner as stage 312 in FIG. 3A. DCT stage 344 performs an N-point scaled 1D DCT on each row of a block of pre-multiplied samples from stage 342. DCT stage 346 performs an N-point scaled 1D DCT on each column of an intermediate block generated by DCT stage 344.

As shown in FIGS. 3A to 3C, the scaling for the full 2D DCT may be achieved in various manners such as with 2D scaling after the row-column 1D DCTs in FIG. 3A, with separable row-column scaling after the row-column 1D DCTs in FIG. 3B, or with scaling after each 1D DCT in FIG. 3C. The scaling may also be performed in other manners. As shown in FIG. 3D, the scaled 2D DCT may be achieved by simply omitting the scaling and performing 1D DCTs for rows and columns.

Various types of scaled 1D DCT may be used for the scaled 1D DCTs in FIGS. 3A to 3D. An example scaled DCT with low complexity is described below.

Figure 4:
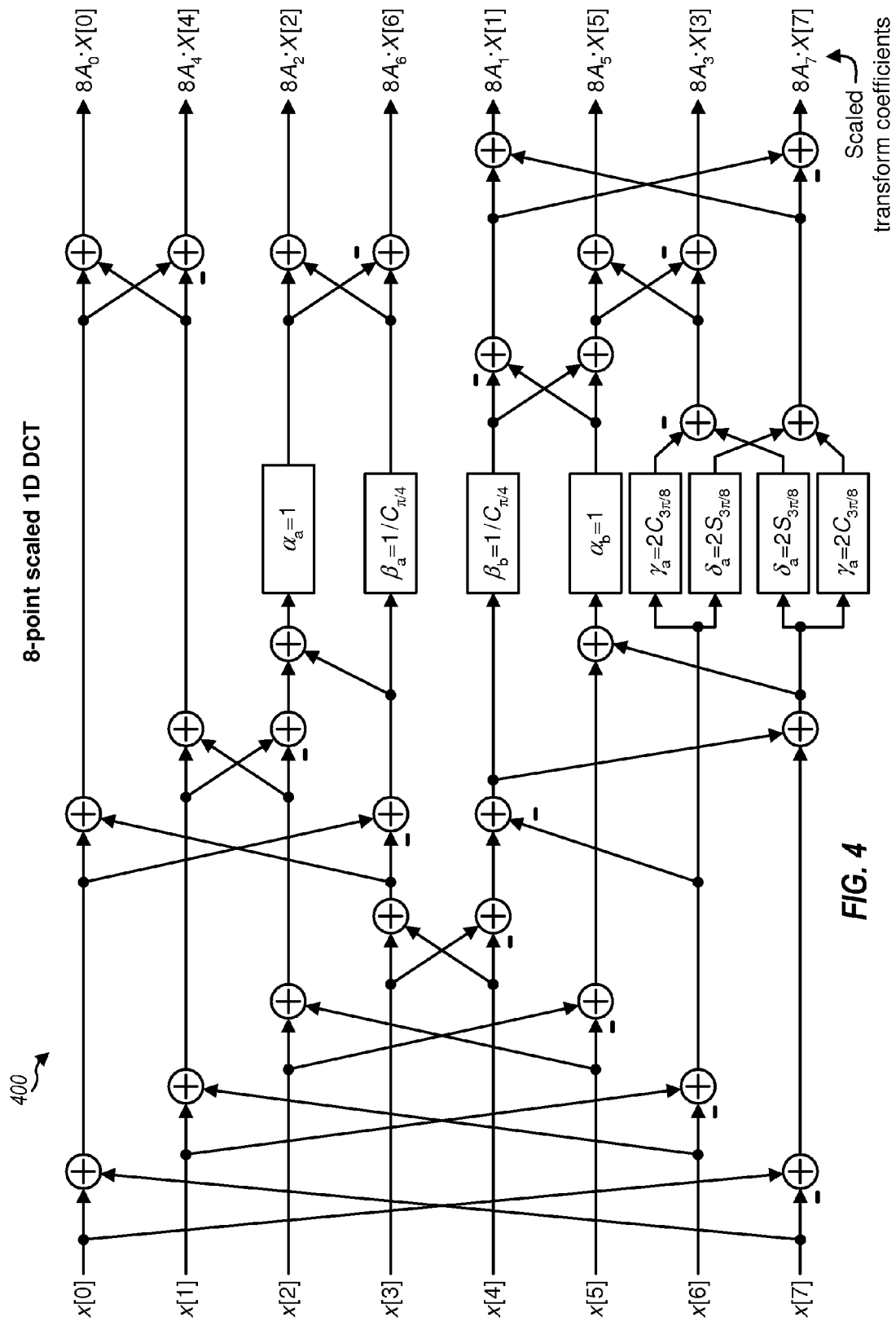
FIG. 4 shows a flow graph of a factorization of an 8-point 1D DCT.

FIG. 4 shows a flow graph 400 of an example factorization of an 8-point 1D DCT. Flow graph 400 receives eight input samples x[0] through x[7], performs an 8-point scaled 1D DCT on these input samples, and generates eight scaled transform coefficients $8A_0 \cdot X[0]$ through $8A_7 \cdot X[7]$. The scale factors $A_0$ through $A_7$ are given above. The factorization in FIG. 4 has multiplications with the following constant factors:

$\alpha_a = \beta_b = 1$, $\beta_a = \beta_b = 1/C_{\pi/4} = 1/\cos(\pi/4)$ $\gamma_a = 2C_{3\pi/8} = 2\cos(3\pi/8)$, and $\delta_a = 2S_{3\pi/8} = 2\sin(3\pi/8)$. Eq (33)

The flow graphs for the IDCT and DCT in FIGS. 2 and 4 are similar and involve multiplications by essentially the same constant factors (with the difference in ½). Such similarity may be advantageous for implementation of the DCT and IDCT on an integrated circuit. In particular, the similarity may enable savings of silicon or die area to implement the butterflies and the multiplications by transform constants, which are used in both the forward and inverse transforms.

Figure 5:
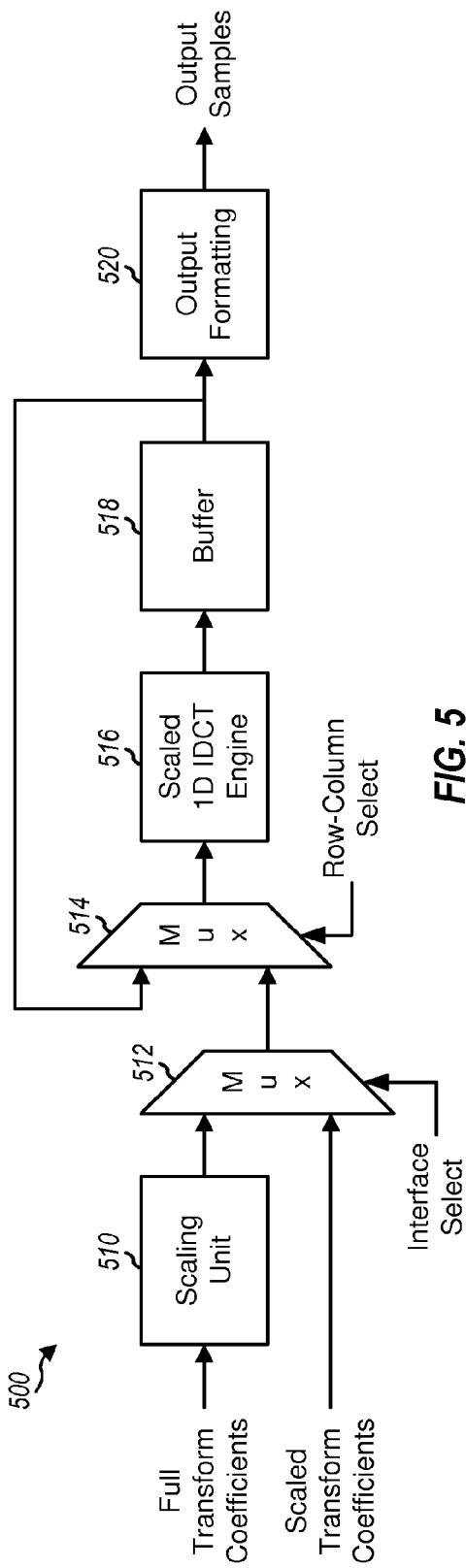
FIG. 5 shows an IDCT processor supporting full and scaled interfaces.

FIG. 5 shows a block diagram of a design of an IDCT processor 500 that supports full and scaled interfaces. Within IDCT processor 500, a scaling unit 510 receives a block of transform coefficients via the full interface, performs scaling (e.g., element-wise 2D scaling or separable row-column scaling) on the block of transform coefficients, and provides a block of scaled transform coefficients. A multiplexer (Mux) 512 receives and provides the scaled transform coefficients from scaling unit 510 when the full interface is selected. Multiplexer 512 also receives scaled transform coefficients via the scaled interface and provides these scaled transform coefficients when the scaled interface is selected. A multiplexer 514 provides the output of multiplexer 512 or the output of a buffer 518 to an IDCT engine 516.

IDCT engine 516 may perform scaled 1D IDCTs on rows of the block of scaled transform coefficients from multiplexer 512 and provide rows of a block of intermediate results to buffer 518. IDCT engine 516 may then perform scaled 1D IDCTs on columns of the block of intermediate results from buffer 518 and provide a block of final results to buffer 518. A unit 520 performs output formatting on the final results in buffer 518 and provides output samples.

Figure 6:
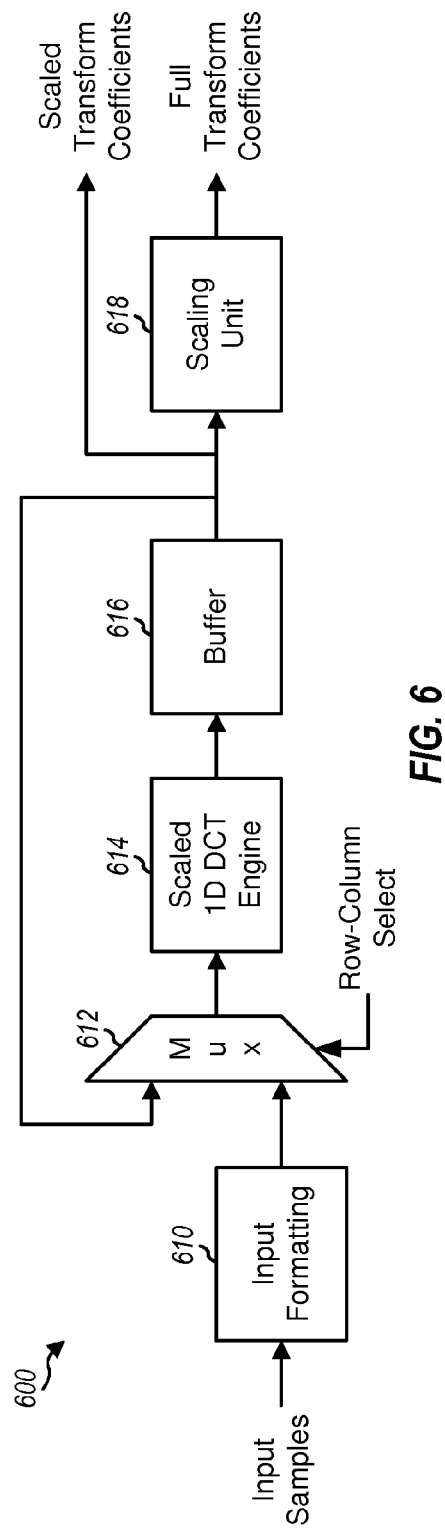
FIG. 6 shows a DCT processor supporting full and scaled interfaces.

FIG. 6 shows a block diagram of a design of a DCT processor 600 that supports full and scaled interfaces. Within DCT processor 600, a unit 610 performs input formatting on a block of input samples. A DCT engine 614 receives the block of input values from unit 610 via a multiplexer 612, performs scaled 1D DCTs on rows of the block of input values, and provides a block of intermediate results to a buffer 616. DCT engine 614 may then perform scaled 1D DCTs on columns of the block of intermediate results from buffer 616 and provide a block of scaled transform coefficients to buffer 616. Buffer 616 provides the block of scaled transform coefficients for the scaled interface. A scaling unit 618 receives and scales the block of scaled transform coefficients and provides full transform coefficients for the full interface.

For clarity, much of the description above is for DCT and IDCT. In general, the techniques described herein may be used for any type of transform such as DCT, IDCT, DFT, IDFT, MLT, inverse MLT, MCLT, inverse MCLT, etc. The techniques may also be used for any factorization of a transform, with several example factorizations being given in FIGS. 2 and 4. The techniques may also be used for transforms of any size, with 8-point transforms being given in FIGS. 2 and 4. 8×8 DCT and 8×8 IDCT are commonly used for image and video processing. The techniques may also be used for various image and video coding standards such as JPEG, MPEG-1, MPEG-2, MPEG-4 (P.2), H.261, H.263, etc.

Figure 7:
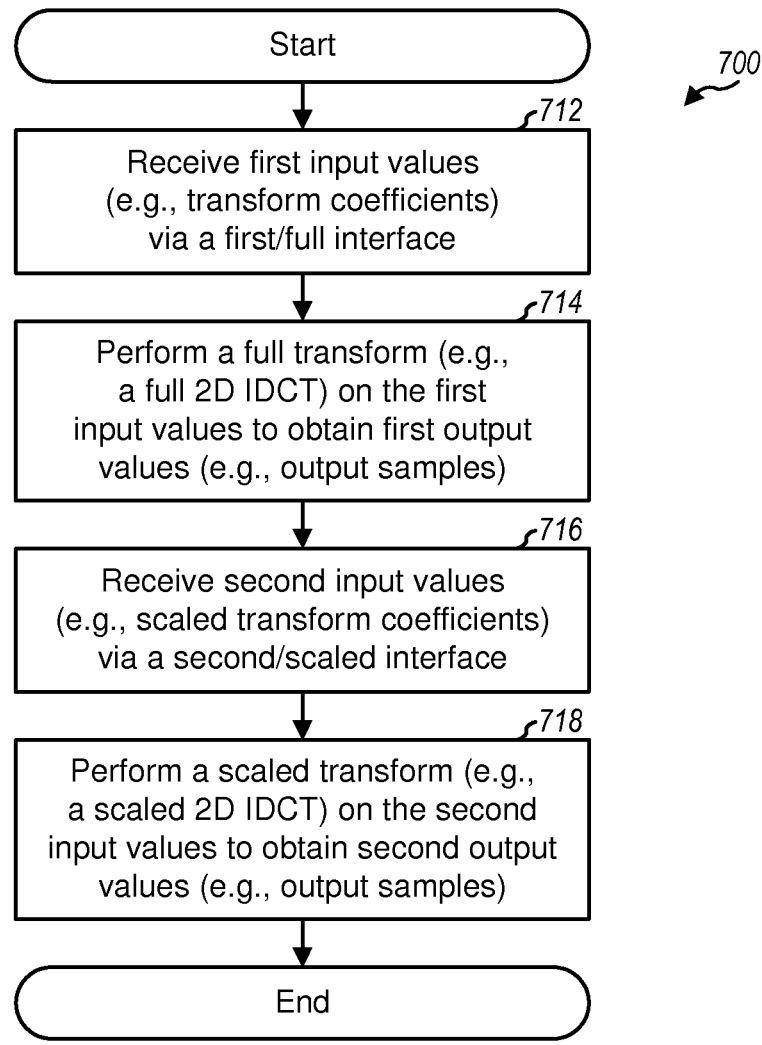
FIG. 7 shows a process for performing transform.

FIG. 7 shows a design of a process 700 for performing transform. First input values may be received via a first interface (a full or non-scaled interface) (block 712). A full transform may be performed on the first input values to obtain first output values (block 714). Second input values may be received via a second interface (a scaled interface) (block 716). A scaled transform may be performed on the second input values to obtain second output values (block 718).

The full transform may be a full 2D inverse transform. In this case, a block of first input values may be received via the first interface and scaled to obtain a block of scaled input values. A scaled 1D transform may be performed on each row of the block of scaled input values to obtain an intermediate block. A scaled 1D transform may be performed on each column of the intermediate block to obtain a block of first output values. The scaled 1D transforms may also be performed on columns followed by rows.

The full transform may also be a full 2D forward transform. In this case, a block of first input values may be received via the first interface. A scaled 1D transform may be performed on each row of the block of input values to obtain a first intermediate block. A scaled 1D transform may be performed on each column of the first intermediate block to obtain a second intermediate block. The second intermediate block may be scaled to obtain a block of first output values.

The full transform may be a full 2D IDCT. In this case, a block of transform coefficients may be received via the first interface and scaled to obtain a block of scaled transform coefficients. Each transform coefficient may be scaled with a respective scale factor to obtain a corresponding scaled transform coefficient, e.g., as shown in FIG. 1A. Alternatively, the block of transform coefficients may be scaled row-wise and column-wise to obtain the block of scaled transform coefficients, e.g., as shown in FIG. 1B. A scaled 1D IDCT may be performed on each row of the block of scaled transform coefficients to obtain an intermediate block. A scaled 1D IDCT may be performed on each column of the intermediate block to obtain a block of output samples. Alternatively, scaling and scaled one 1D IDCT may be performed on each row of the block of transform coefficients to obtain an intermediate block, and scaling and scaled 1D IDCT may be performed on each column of the intermediate block, e.g., as shown in FIG. 1C.

The scaled transform may be a scaled 2D IDCT. In this case, a block of scaled transform coefficients may be received via the second interface. A scaled 1D IDCT may then be performed on each row of the block of scaled transform coefficients to obtain an intermediate block. A scaled 1D IDCT may be performed on each column of the intermediate block to obtain a block of output samples.

The full transform may be a full 2D DCT, and the scaled transform may be a scaled 2D DCT. A full 2D DCT may be performed on a block of input samples as described above to obtain a block of full transform coefficients for the first interface. A scaled 2D DCT may also be performed on the block of input samples to obtain a block of scaled transform coefficients for the second interface.

FIG. 8 shows a block diagram of a design of an encoding system 810 and a decoding system 850. At encoding system 810, an image/video encoder 820 may receive blocks of pixels and perform compression on each pixel block in accordance with a particular image or video compression algorithm. Encoder 820 may provide blocks of pixel difference values (or residuals) and blocks of pixels. A unit 822 may receive the residual blocks and pixel blocks as blocks of input samples, perform 2D DCT on each input sample block, and provide blocks of full or scaled transform coefficients. Unit 822 may support both full and scaled interfaces. A quantizer 824 may quantize the full or scaled transform coefficients and provide quantized coefficients. An entropy encoder 826 may perform entropy encoding on the quantized coefficients and provide compressed data in packets or a bit stream for transmission via a communication channel 840 and/or storage.

At decoding system 850, an entropy decoder 860 may perform entropy decoding on the compressed data in a manner complementary to the entropy encoding by encoder 826 and provide quantized coefficients. An inverse quantizer 862 may map the quantized coefficients to full or scaled transform coefficients. A unit 862 may perform full 2D IDCT on full transform coefficients or scaled 2D IDCT on scaled transform coefficients and provide blocks of output samples. Unit 862 may support both full and scaled interfaces. An image/video decoder 866 may perform decompression on the blocks of output samples and provide blocks of pixels.

At encoding system 810, unit 822 may perform scaled 2D DCT and provide scaled transform coefficients. Quantizer 824 may perform scaling (e.g., stage 318 in FIG. 3A or stage 328 in FIG. 3B) as well as quantization of the scaled transform coefficients. At decoding system 850, unit 862 may perform inverse quantization as well as scaling (e.g., stage 112 in FIG. 1A or stage 122 in FIG. 1B) for the transform coefficients. Unit 864 may then perform scaled 2D IDCT on the scaled transform coefficients from unit 862.

Figure 9:
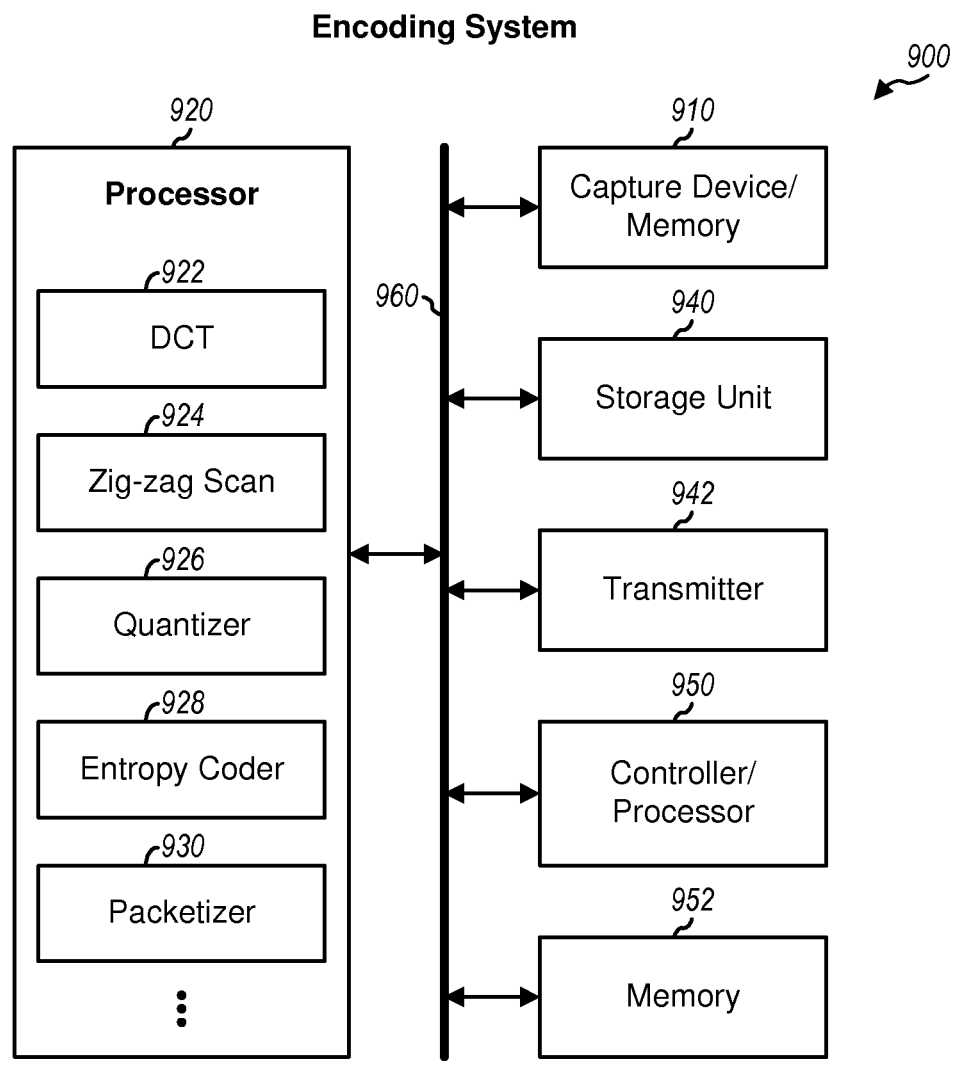
FIG. 9 shows a block diagram of the encoding system.

FIG. 9 shows a block diagram of an encoding system 900, which may be used for encoding system 810 in FIG. 8. A capture device/memory 910 may receive a source signal, perform conversion to digital format, and provides input/raw data. Capture device 910 may be a video camera, a digitizer, or some other device. A processor 920 processes the raw data and generates compressed data. Within processor 920, the raw data may be transformed by a DCT unit 922, scanned by a zig-zag scan unit 924, quantized by a quantizer 926, encoded by an entropy encoder 928, and packetized by a packetizer 930. DCT unit 922 may perform 2D DCTs on the raw data in accordance with the techniques described herein and may support both full and scaled interfaces. Each of units 922 through 930 may be implemented a hardware, firmware and/or software. For example, DCT unit 922 may be implemented with dedicated hardware, a set of instructions for an arithmetic logic unit (ALU), etc.

A storage unit 940 may store the compressed data from processor 920. A transmitter 942 may transmit the compressed data. A controller/processor 950 controls the operation of various units in encoding system 900. A memory 952 stores data and program codes for encoding system 900. One or more buses 960 interconnect various units in encoding system 900.

Figure 10:
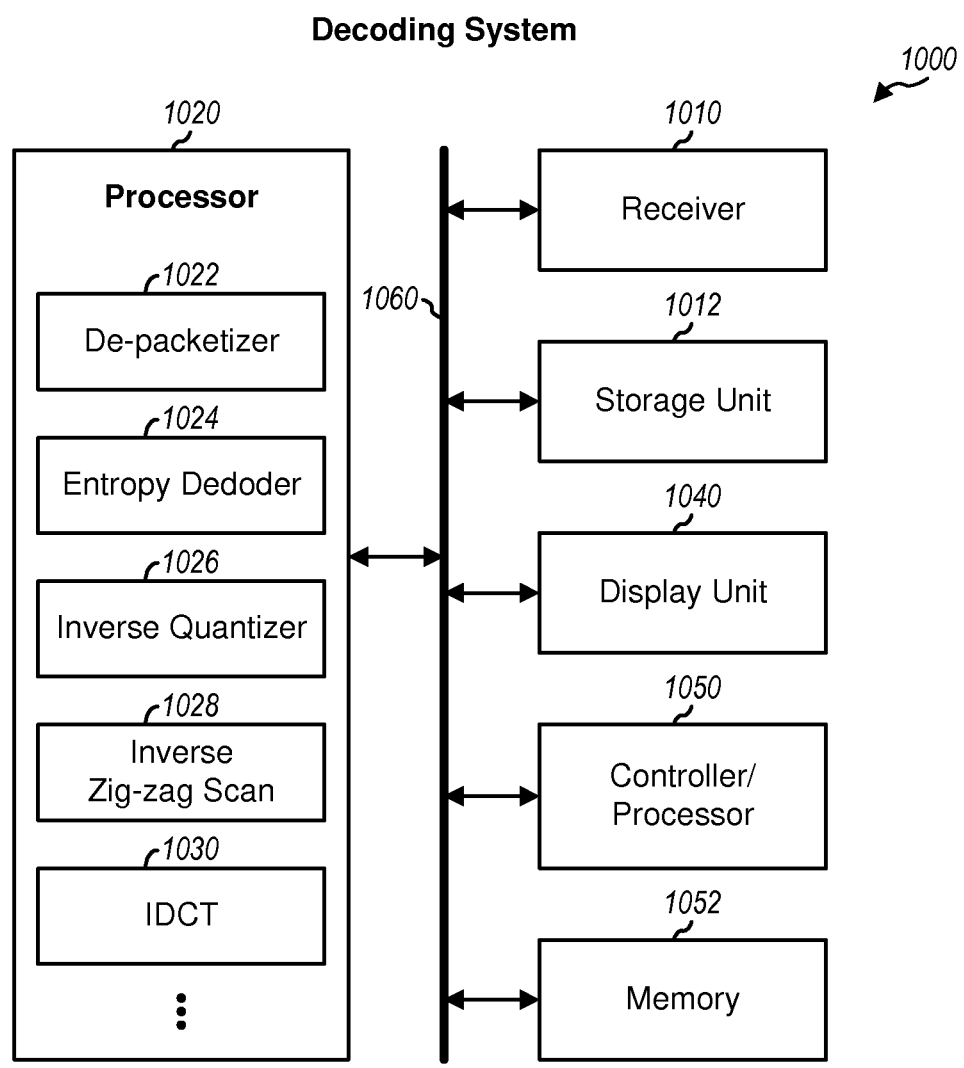
FIG. 10 shows a block diagram of the decoding system.

FIG. 10 shows a block diagram of a decoding system 1000, which may be used for decoding system 850 in FIG. 8. A receiver 1010 may receive compressed data from an encoding system, and a storage unit 1012 may store the received compressed data. A processor 1020 processes the compressed data and generates output data. Within processor 1020, the compressed data may be de-packetized by a de-packetizer 1022, decoded by an entropy decoder 1024, inverse quantized by an inverse quantizer 1026, placed in the proper order by an inverse zig-zag scan unit 1028, and transformed by an IDCT unit 1030. IDCT unit 1030 may perform 2D IDCTs on the full or scaled transform coefficients in accordance with the techniques described herein and may support both full and scaled interfaces. Each of units 1022 through 1030 may be implemented a hardware, firmware and/or software. For example, IDCT unit 1030 may be implemented with dedicated hardware, a set of instructions for an ALU, etc.

A display unit 1040 displays reconstructed images and video from processor 1020. A controller/processor 1050 controls the operation of various units in decoding system 1000. A memory 1052 stores data and program codes for decoding system 1000. One or more buses 1060 interconnect various units in decoding system 1000.

Processors 920 and 1020 may each be implemented with one or more application specific integrated circuits (ASICs), digital signal processors (DSPs), and/or some other type of processors. Alternatively, processors 920 and 1020 may each be replaced with one or more random access memories (RAMs), read only memory (ROMs), electrical programmable ROMs (EPROMs), electrically erasable programmable ROMs (EEPROMs), magnetic disks, optical disks, and/or other types of volatile and nonvolatile memories known in the art.

The techniques described herein may be implemented in various types of apparatus. For example, the techniques may be implemented in different types of processors, different types of integrated circuits, different types of electronics devices, different types of electronics circuits, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the present disclosure. Various modifications to the disclosure may be readily apparent to those skilled in the art, and the generic principles defined herein may be applied to other designs without departing from the spirit or scope of the disclosure. Thus, the present disclosure is not intended to be limited to the examples shown herein but is to be accorded the widest scope consistent with the principles and novel features disclosed herein.

What is claimed is:

1. An apparatus for image/video compression utilizing spatially decorrelated blocks of picture elements (pixels) in at least one image or at least one video frame comprising:
    a memory; and
    a processor coupled to the memory, the processor configured to:
        receive a block of input sample values corresponding to a block of pixels via an interface,
        determine if the block of input sample values comprises full input value or scaled input values and:
            if the block of input sample values comprises full input values, then perform a full two-dimensional (2D) transform on the block of input sample values to obtain a block of output values corresponding to a block of encoded pixels, comprising:
                performing a scaled one-dimensional (1D) transform on each row of the block of input sample values to obtain a first intermediate block,
                performing a scaled 1D transform on each column of the first intermediate block to obtain a second intermediate block comprising scaled transform coefficients, and
                scaling the second intermediate block to obtain a block of output values, and
            if the block of input sample values comprises scaled input values, then perform a scaled two-dimensional (2D) transform on the block of input sample values to obtain a block of output values corresponding to a block of encoded pixels, comprising:
                performing a scaled one-dimensional (1D) transform on each row of the block of input sample values to obtain a first intermediate block,
                performing a scaled 1D transform on each column of the first intermediate block to obtain a second intermediate block comprising scaled transform coefficients, and
                scaling the second intermediate block to obtain a block of output values,
        quantizing and entropy encoding the block of output values to form a compressed data unit, and
        transmitting the compressed data unit.

2. The apparatus of claim 1, wherein the processor is further configured to output the block of scaled transform coefficients and the block of output values.

3. The apparatus of claim 1, wherein the full two-dimensional (2D) transform is a full two-dimensional (2D) discrete cosine transform.

4. The apparatus of claim 1, wherein the block of output values are a block of full transform coefficients.

5. The apparatus of claim 1, wherein the processor is configured to scale each transform coefficient in a first block of transform coefficients with a respective scale factor to obtain a corresponding scaled transform coefficient in a second block of transform coefficients.

6. The apparatus of claim 1, wherein the processor is configured to scale a first block of transform coefficients row-wise and column-wise to obtain a second block of scaled transform coefficients.

7. A method for image/video compression utilizing spatially decorrelated blocks of picture elements (pixels) in at least one image or at least one video frame, the method comprising:
    receiving a block of input sample values corresponding to a block of pixels via an interface;
    determining by a processor if the block of input sample values comprises full input value or scaled input values and:
        if the block of input sample values comprises full input values, then performing a full two-dimensional (2D) transform on the block of input sample values to obtain a block of output values corresponding to a block of encoded pixels, comprising:
performing a scaled one-dimensional (1D) transform on each row of the block of input values to obtain a first intermediate block,
performing a scaled 1D transform on each column of the first intermediate block to obtain a second intermediate block comprising scaled transform coefficients, and
scaling the second intermediate block to obtain a block of output values, and
if the block of input sample values comprises scaled input values, then performing a scaled two-dimensional (2D) transform on the block of input sample values to obtain a block of output values corresponding to a block of encoded pixels, comprising:
performing a scaled one-dimensional (1D) transform on each row of the block of input sample values to obtain a first intermediate block,
performing a scaled 1D transform on each column of the first intermediate block to obtain a second intermediate block comprising scaled transform coefficients, and
scaling the second intermediate block to obtain a block of output values;
quantizing and entropy encoding the block of output values to form a compressed data unit; and
transmitting the compressed data unit.

8. The method of claim 7, further comprising outputting the block of scaled transform coefficients and the block of output values.

9. The method of claim 7, wherein the full two-dimensional (2D) transform is a full two-dimensional (2D) discrete cosine transform.

10. The method of claim 7, wherein the block of output values are a block of full transform coefficients.

11. The method of claim 7, further comprising scaling each transform coefficient in a first block of transform coefficients with a respective scale factor to obtain a corresponding scaled transform coefficient in a second block of transform coefficients.

12. The method of claim 7, further comprising scaling a first block of transform coefficients row-wise and column-wise to obtain a second block of scaled transform coefficients.

13. An apparatus for image/video compression utilizing spatially decorrelated blocks of picture elements (pixels) in at least one image or at least one video frame comprising:
means for receiving a block of input sample values corresponding to a block of pixels via an interface;
means for determining if the block of input sample values comprises full input value or scaled input values and:
if the block of input sample values comprises full input values, then performing a full two-dimensional (2D) transform on the block of input sample values to obtain a block of output values corresponding to a block of encoded pixels, comprising:
performing a scaled one-dimensional (1D) transform on each row of the block of input sample values to obtain a first intermediate block,
performing a scaled 1D transform on each column of the first intermediate block to obtain a second intermediate block comprising scaled transform coefficients, and
scaling the second intermediate block to obtain a block of output values, and
if the block of input sample values comprises scaled input values, then performing a scaled two-dimensional (2D) transform on the block of input sample values to obtain a block of output values corresponding to a block of encoded pixels, comprising:
performing a scaled one-dimensional (1D) transform on each row of the block of input sample values to obtain a first intermediate block,
performing a scaled 1D transform on each column of the first intermediate block to obtain a second intermediate block comprising scaled transform coefficients, and
scaling the second intermediate block to obtain a block of output values;
means for quantizing and entropy encoding the block of output values to form a compressed data unit; and
means for transmitting the compressed data unit.

14. The apparatus of claim 13, further comprising means for outputting the block of scaled transform coefficients and the block of output values.

15. The apparatus of claim 13, wherein the full two-dimensional (2D) transform is a full two-dimensional (2D) discrete cosine transform.

16. The apparatus of claim 13, wherein the block of output values are a block of full transform coefficients.

17. The apparatus of claim 13, further comprising means for scaling each transform coefficient in a first block of transform coefficients with a respective scale factor to obtain a corresponding scaled transform coefficient in a second block of transform coefficients.

18. The apparatus of claim 13, further comprising means for scaling a first block of transform coefficients row-wise and column-wise to obtain a second block of scaled transform coefficients.

19. An apparatus for image/video compression utilizing spatially decorrelated blocks of picture elements (pixels) in at least one image or at least one video frame comprising:
an input for receiving a block of input sample values corresponding to a block of pixels via an interface;
a processor for determining if the block of input sample values comprises full input value or scaled input values;
a full two-dimensional (2D) transform engine for performing, when the block of input sample values comprises full input values, a full two-dimensional (2D) transform on the block of input sample values to obtain a block of output values corresponding to a block of encoded pixels by:
performing a scaled one-dimensional (1D) transform on each row of the block of input sample values to obtain a first intermediate block,
performing a scaled 1D transform on each column of the first intermediate block to obtain a second intermediate block comprising scaled transform coefficients, and
scaling the second intermediate block to obtain a block of output values; and
a scaled two-dimensional (2D) transform engine for performing, when the block of input sample values comprises scaled input values, a scaled two-dimensional (2D) transform on the block of input sample values to obtain a block of output values corresponding to a block of encoded pixels by:
performing a scaled one-dimensional (1D) transform on each row of the block of input sample values to obtain a first intermediate block, performing a scaled 1D transform on each column of the first intermediate block to obtain a second intermediate block comprising scaled transform coefficients, and scaling the second intermediate block to obtain a block of output values;

a quantizer for quantizing and entropy encoding the block of output values to form a compressed data unit; and a transmitter for transmitting the compressed data unit.

20. The apparatus of claim 19, further comprising an output for outputting the block of scaled transform coefficients and the block of output values.

21. The apparatus of claim 19, wherein the full two-dimensional (2D) transform is a full two-dimensional (2D) discrete cosine transform.

22. The apparatus of claim 19, wherein the block of output values are a block of full transform coefficients.

23. The apparatus of claim 19, further comprising a scaling unit for scaling each transform coefficient in a first block of transform coefficients with a respective scale factor to obtain a corresponding scaled transform coefficient in a second block of transform coefficients.

24. The apparatus of claim 19, further comprising a scaling unit for scaling a first block of transform coefficients row-wise and column-wise to obtain a second block of scaled transform coefficients.

25. A non-transitory processor-readable media for storing instructions for image/video compression utilizing spatially decorrelated blocks of picture elements (pixels) in at least one image or at least one video frame, said instructions causing a processor to:

receive a block of input sample values corresponding to a block of pixels via an interface, determine if the block of input sample values comprises full input value or scaled input values and:

if the block of input sample values comprises full input values, then perform a full two-dimensional (2D) transform on the block of input sample values to obtain a block of output values corresponding to a block of encoded pixels, comprising:

performing a scaled one-dimensional (1D) transform on each row of the block of input sample values to obtain a first intermediate block, performing a scaled 1D transform on each column of the first intermediate block to obtain a second intermediate block comprising scaled transform coefficients, and scaling the second intermediate block to obtain a block of output values, and if the block of input sample values comprises scaled input values, then perform a scaled two-dimensional (2D) transform on the block of input sample values to obtain a block of output values corresponding to a block of encoded pixels, comprising:

performing a scaled one-dimensional (1D) transform on each row of the block of input sample values to obtain a first intermediate block, performing a scaled 1D transform on each column of the first intermediate block to obtain a second intermediate block comprising scaled transform coefficients, and scaling the second intermediate block to obtain a block of output values;

quantize and entropy encoding the block of output values to form a compressed data unit; and transmit the compressed data unit.

26. The processor-readable media of claim 25, further comprising instructions to output the block of scaled transform coefficients and the block of output values.

27. The processor-readable media of claim 25, wherein the full two-dimensional (2D) transform is a full two-dimensional (2D) discrete cosine transform.

28. The processor-readable media of claim 25, wherein the block of output values are a block of full transform coefficients.

29. The processor-readable media of claim 25, further comprising instructions to scale each transform coefficient in a first block of transform coefficients with a respective scale factor to obtain a corresponding scaled transform coefficient in a second block of transform coefficients.

30. The processor-readable media of claim 25, further comprising instructions to scale a first block of transform coefficients row-wise and column-wise to obtain a second block of scaled transform coefficients.

* * * * *